(12) United States Patent
Bushelman

(10) Patent No.: US 11,352,499 B2
(45) Date of Patent: Jun. 7, 2022

(54) SULFONE POLYMER COMPOSITION

(71) Applicant: SOLVAY SPECIALTY POLYMERS USA, LLC, Alpharetta, GA (US)

(72) Inventor: Corinne Bushelman, Cumming, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 15/508,334

(22) PCT Filed: Sep. 2, 2015

(86) PCT No.: PCT/EP2015/070049
§ 371 (c)(1),
(2) Date: Mar. 2, 2017

(87) PCT Pub. No.: WO2016/034624
PCT Pub. Date: Mar. 10, 2016

(65) Prior Publication Data
US 2017/0292022 A1    Oct. 12, 2017

Related U.S. Application Data

(60) Provisional application No. 62/045,105, filed on Sep. 3, 2014.

(30) Foreign Application Priority Data

Oct. 2, 2014  (EP) .................................. 14187493

(51) Int. Cl.

| C08L 81/06 | (2006.01) |
| C08K 3/22 | (2006.01) |
| C08K 5/315 | (2006.01) |
| C08K 5/3475 | (2006.01) |
| C08K 5/3492 | (2006.01) |
| C08K 5/357 | (2006.01) |
| C08L 81/00 | (2006.01) |
| C08G 75/00 | (2006.01) |
| C08G 75/20 | (2016.01) |
| C08J 3/20 | (2006.01) |
| C08K 5/098 | (2006.01) |
| C08J 3/00 | (2006.01) |
| C08G 69/48 | (2006.01) |
| C08K 7/14 | (2006.01) |
| C08K 3/00 | (2018.01) |
| C08K 5/00 | (2006.01) |
| H01B 3/30 | (2006.01) |

(52) U.S. Cl.
CPC ............. *C08L 81/06* (2013.01); *C08G 69/48* (2013.01); *C08G 75/00* (2013.01); *C08G 75/20* (2013.01); *C08J 3/00* (2013.01); *C08J 3/203* (2013.01); *C08K 3/00* (2013.01); *C08K 3/22* (2013.01); *C08K 5/00* (2013.01); *C08K 5/098* (2013.01); *C08K 5/315* (2013.01); *C08K 5/3475* (2013.01); *C08K 5/3492* (2013.01); *C08K 5/357* (2013.01); *C08K 7/14* (2013.01); *C08L 81/00* (2013.01); *H01B 3/30* (2013.01); *C08J 2381/06* (2013.01); *C08K 2003/222* (2013.01); *C08K 2003/2241* (2013.01); *C08L 2201/08* (2013.01)

(58) Field of Classification Search
CPC .................... C08G 75/20; C08G 75/23; C08K 2003/2206; C08K 2003/222; C08K 2003/2227; C08K 5/3492; C08K 5/315; C08K 5/3437; C08K 5/3475; C08L 81/06; C08L 2666/28
See application file for complete search history.

(56) References Cited

U.S. PATENT DOCUMENTS

| 5,151,462 | A | 9/1992 | El-Hibri et al. |
| 5,217,490 | A * | 6/1993 | Sayano ..................... A61F 2/16 |
| | | | 623/6.61 |
| 5,591,850 | A | 1/1997 | Birbaum et al. |
| 5,688,995 | A | 11/1997 | Luther |
| 5,942,564 | A | 8/1999 | Kaschig et al. |
| 6,124,390 | A * | 9/2000 | Nagashima ............... C08K 3/22 |
| | | | 524/425 |
| 6,441,077 | B1 * | 8/2002 | Border ................... B82Y 30/00 |
| | | | 524/415 |
| 6,482,880 | B1 * | 11/2002 | Rock ....................... C08L 79/08 |
| | | | 524/405 |
| 8,389,719 | B2 | 3/2013 | Vogel et al. |
| 2004/0164279 | A1 | 8/2004 | Stevenson et al. |
| 2006/0058430 | A1 | 3/2006 | Dyllick-Brenzinger et al. |

(Continued)

FOREIGN PATENT DOCUMENTS

| EP | 0755980 A2 * | 1/1997 | .............. C08L 71/00 |
| EP | 0778077 A2 * | 6/1997 | ............. B01D 71/64 |
| EP | 2256167 A1 | 12/2010 | |
| JP | H03199265 | * 8/1991 | |

(Continued)

OTHER PUBLICATIONS

Translation of JPH03199265 (1991) (Year: 1991).*
Sumika Excell datasheet (Year: 2019).*
Solvay Specialty Polymers "Udel® PSU design Guide" (84 pg)—Initially published Mar. 2007, revised Jul. 2015; accessed online on Feb. 17, 2020 at https://www.solvay.jp/ja/binaries/Udel-PSU-Design-Guide_EN-227550.pdf.

(Continued)

*Primary Examiner* — Robert C Boyle
(74) *Attorney, Agent, or Firm* — Beatrice C. Ortego

(57) ABSTRACT

The invention pertains to a polymer composition possessing improved resistance towards degradation and discolouring phenomena induced by UV radiation, said composition comprising at least one aromatic sulfone polymer; at least one organic UV absorber and at least one basic compound selected from the group consisting of (i) basic oxides and hydroxides of divalent metals and (ii) salts of a weak acid, and to methods for its manufacture and to shaped articles obtained therefrom.

13 Claims, 1 Drawing Sheet

(56) References Cited

U.S. PATENT DOCUMENTS

| | | | |
|---|---|---|---|
| 2006/0089433 A1* | 4/2006 | Hugi | C08K 5/357 |
| | | | 524/87 |
| 2007/0066738 A1 | 3/2007 | Gallucci et al. | |
| 2007/0142569 A1 | 6/2007 | Donovan et al. | |
| 2007/0197739 A1* | 8/2007 | Aneja | C08L 71/10 |
| | | | 525/437 |
| 2010/0041787 A1* | 2/2010 | Chen | C07D 251/24 |
| | | | 523/106 |
| 2012/0149796 A1 | 6/2012 | Weber et al. | |
| 2012/0301766 A1* | 11/2012 | Monden | C08L 69/00 |
| | | | 429/100 |

FOREIGN PATENT DOCUMENTS

| | | |
|---|---|---|
| WO | 2004000941 A1 | 12/2003 |
| WO | 2007035402 A2 | 3/2007 |
| WO | 2012128340 A1 | 9/2012 |
| WO | 2013092628 A1 | 6/2013 |

OTHER PUBLICATIONS

"Magnesium Oxide" in Chemical Book (1 pg.) accessed online on Feb. 17, 2020 at https://www.chemicalbook.com/Chemical-ProductProperty_EN_CB8853024.htm.

\* cited by examiner

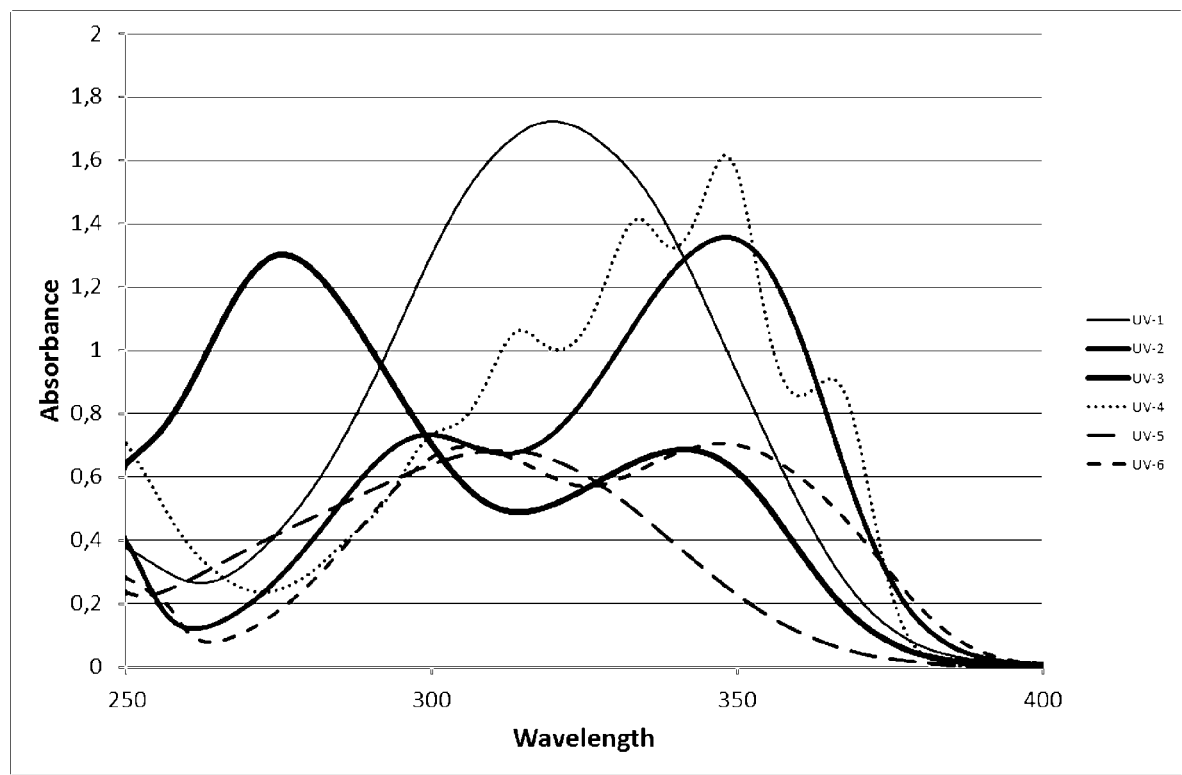

SULFONE POLYMER COMPOSITION

CROSS-REFERENCE TO RELATED APPLICATIONS

This application claims priority to U.S. provisional application No. 62/045,105 filed Sep. 3, 2014 and to European application No. 14187493.3 filed Oct. 2, 2014, the whole content of each of these applications being incorporated herein by reference for all purposes.

TECHNICAL FIELD

The invention pertains to a novel sulfone polymer composition advantageously possessing improved UV resistance performances, to a method for its manufacture, to a method for its processing into shaped articles, and to shaped articles manufactured therefrom.

BACKGROUND ART

Exposure to UV light is known to adversely impacts the properties of polymers, including notably decrease of mechanical properties, yellowing, loss of gloss, discolouring, etc. . . .

These effects are particularly observed in polymeric substrates containing aromatic moieties, wherein said aromatic nuclei comprised therein are particularly sensitive to UV/VIS radiation, up to wavelengths of approximately 420 nm.

To avoid, or at least limit, the detrimental impact of UV radiation on polymeric materials, stabilisers are conventionally used.

Stabilizers can be divided in three categories, defined by their mode of action to prevent photo-degradation:

1. Quenchers, which are able to bring back "excited" chromophores (due to photon absorption) to a stable state;
2. Radical scavengers, such as HALS (hindered aromatic amine compounds), which are reactive towards free radicals formed after decomposition of "excited" chromophores (typically through generation of hydroperoxy radicals, and hence hydroperoxides and free radicals, by interaction with oxygen):
3. UV absorbers, which filter out harmful UV radiation, quickly transforming the same into vibrational and rotational energy of the molecule (hence into harmless heat), thus preventing the photodegradation of the polymer.

In other terms, compounds of this latter class are chromophores that can go back to their stable state after light absorption without creating harmful free radicals (deactivation of the excited state by electronic rearrangement and heat dissipation).

For a UV absorber to be effective in a polymer matrix, it is thus necessary for the UV absorber to absorb UV radiation through a chromophore group present in the molecule more quickly and more efficiently than the chromophores present in the polymer.

The most important UV absorbers are:
a) 2-(2-hydroxyphenyl)-benzotriazoles
b) 2-hydroxy-benzophenones
c) 2-hydroxyphenyl-triazines
d) oxalanilides
e) cyanoacrylates.

The efficiency of UV absorbers is generally understood as being mainly dependent on their absorbance and their extinction coefficient.

Nevertheless, when considering incorporation of UV absorbers into aromatic polymers, other considerations have to be taken into account, including ability of the UV absorber to withstand conditions encountered during processing of the said aromatic polymer, which can be as high as about ~380-400° C.

Within this frame, U.S. Pat. No. 8,378,9719 (CIBA SPECIALTY CHEMICALS CORP.) May 3, 2013 relates to certain hydroxyphenyl triazine UV-absorbers, which are taught therein as useful for stabilizing a very large variety of polymer substrates, including polyolefins, styrene polymers, polymers derived from vinyl aromatic monomers, halogen-containing polymers, polymers derived from alpha,beta unsaturated acids and derivatives thereof; polymers derived from unsaturated alcohols and amines; polyacetals; polyphenylene oxides; polyurethanes; polyamides; polyimides; polyamide-imides; polyether-imides; polyester-imides; polyesters; polycarbonates; polyketones; polysulfones; phenol/formaldehyde resins; alkyd resins; epoxy resins; natural polymers including cellulose, rubber, gelatin and chemically modified analogous thereof.

Nevertheless, the choice of an appropriate UV absorber for sulfone polymers remains a critical task, as presently no suitable solution is indeed available in the art for efficient stabilization against degradation induced by UV and VIS radiation.

SUMMARY OF INVENTION

The invention hereby provides a solution to aforementioned shortfall and provides for an aromatic sulfone polymer composition having improved UV resistance. More precisely, the present invention provides for a composition comprising:

at least one aromatic sulfone polymer [polymer (P)];
at least one organic UV absorber [absorber (UV)]; and
at least one basic compound [compound (B)] selected from the group consisting of (i) basic oxides and hydroxides of divalent metals and (ii) salts of a weak acid.

The Applicant has surprisingly found that organic UV absorber, as above detailed, although possessing high absorption capability (high extinction coefficients in UV-VIS region) towards UV light, are substantially ineffective as stabilizers against UV in sulfone polymers, except when used in admixture with a compound (B), as above detailed.

By combined addition of a absorber (UV) and a compound (B), as detailed above, in an aromatic sulfone polymer composition, a surprising and significant synergistic effect in stabilization against UV radiation is achieved, which is particularly advantageous in several fields of use, wherein final parts maybe exposed to UV radiation for prolonged time.

BRIEF DESCRIPTION OF DRAWINGS

FIG. 1 is a plot of absorbance as a function of wavelength for three different UV absorbers of hydroxyphenyl-triazine type (UV-1, UV-2, UV-3, solid lines), for a UV absorber of benzoxazin-4-one type (UV-4, dotted line), for a UV absorber of cyano-acrylate-type (UV-5, dotted line), and a UV absorber of benzotriazole type (UV-6, dotted line)(as 10 ppm solution in methylene chloride).

DESCRIPTION OF EMBODIMENTS

The expression "organic UV absorber" is used within the context of the present invention according to its usual meaning, i.e. to designate an organic compound possessing absorption bands in the region ranging from 250 to 400 nm.

Absorbers (UV) which have been found particularly advantageous within the frame of the present invention are selected from the group consisting of hydroxylphenyl-triazine compounds [compounds (T)], cyanoacrylate compounds [compounds (CN)], benzoxazin-4-one compounds [compounds (BX)], and benzotriazole compounds [compounds (BT)].

Hydroxylphenyl-triazine compounds [compounds (T)] are compounds of formula (I):

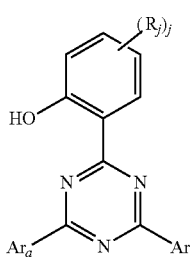

formula (I)

wherein:
$Ar_a$ and $Ar_b$, equal to or different from each other, are independently aromatic groups, said aromatic groups possibly comprising one or more than one heteroatom;
$R_j$ is a halogen or a hydrocarbon group possibly comprising one or more than one heteroatom;
j is zero or is an integer of 1 to 4, in particular 1 to 2.

Compound (T) is preferably a compound complying with formula (II):
wherein:

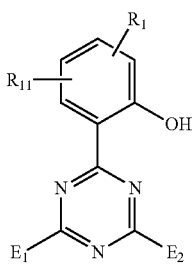

formula (II)

$E_1$ and $E_2$, equal to or different from each other, is independently a substituted or unsubstituted naphthyl; or a substituted of unsubstituted aromatic carbocyclic fused ring comprising at least 3 rings, or is a substituted or unsubstituted aromatic hetero ring system comprising one or more rings; or corresponds to the formula (III):

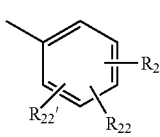

formula (III)

$R_1$ is H, $C_1$-$C_{24}$ alkyl, $C_2$-$C_{18}$ alkenyl, $C_5$-$C_{12}$ cycloalkyl, $C_7$-$C_{15}$ phenylalkyl, phenyl, or said phenyl or said phenylalkyl substituted on the phenyl ring by $C_1$-$C_8$ alkyl; or $OR_3$;

$R_2$ is H, $C_1$-$C_{18}$ alkyl; $C_2$-$C_6$ alkenyl; phenyl; phenyl substituted by $C_1$-$C_8$ alkyl or by $C_1$-$C_8$ alkoxy; $C_7$-$C_{11}$ phenylalkyl; $C_5$-$C_{12}$ cycloalkyl; $COOR_4$; CN; $NH_2$, $NHR_7$, —$N(R_7)(R_8)$, NH—CO—$R_5$; halogen; $C_1$-$C_{18}$ haloalkyl; $C_1$-$C_{18}$ alkoxy; —S—$R_3$ or —O—$R_3$;

$R_3$ is independently H, $C_1$-$C_{18}$ alkyl; $C_5$-$C_{12}$ cycloalkyl; $C_3$-$C_{18}$ alkenyl; phenyl; $C_1$-$C_{18}$ alkyl that is substituted by phenyl, OH, $C_1$-$C_{18}$ alkoxy, $C_5$-$C_{12}$ cycloalkoxy, $C_3$-$C_{18}$ alkenyloxy, halogen, —COOH, —$COOR_4$, —O—CO—$R_5$, —O—CO—O—$R_6$, —CO—$NH_2$, —CO—$NHR_7$, —CO—$N(R_7)(R_8)$, CN, $NH_2$, $NHR_7$, —$N(R_7)(R_8)$, —NH—CO—$R_5$, phenoxy, $C_1$-$C_{18}$ alkyl-substituted phenoxy, phenyl-$C_1$-$C_4$-alkoxy, $C_6$-$C_{15}$ bicycloalkoxy, $C_6$-$C_{15}$ bicycloalkyl-alkoxy, $C_6$-$C_{15}$ bicycloalkenyl-alkoxy and/or by $C_6$-$C_{15}$-tricycloalkoxy; $C_5$-$C_{12}$ cycloalkyl that is substituted by OH, $C_1$-$C_4$ alkyl, $C_2$-$C_6$ alkenyl and/or by —O—CO—$R_5$; —CO—$R_9$ or —$SO_2$—$R_{10}$; or $C_3$-$C_{50}$ alkyl that is interrupted by one or more oxygen atoms and is unsubstituted or substituted by OH, phenoxy and/or by $C_7$-$C_{18}$ alkylphenoxy; or -A, —$CH_2$—CH(XA)-$CH_2$—O—$R_{12}$; —$CR_{13}R_{13'}$—$(CH_2)_m$—X-A; —$CH_2$—CH(OA)-$R_{14}$; —$CH_2$—CH(OH)—$CH_2$—XA; a group of formula (IV) or (V):

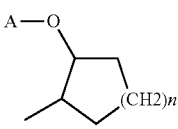

formula (IV)

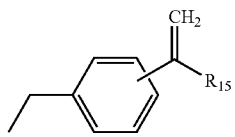

formula (V)

—$CR_{15}R_{15'}$—C(—$CH_2$)—$R_{15''}$; —$CR_{13}R_{13'}(CH_2)_m$—CO—X-A; —$OR_{13}R_{13'}$—$(CH_2)_m$—CO—O—$OR_{15}R_{15'}$—C(—$CH_2$)—$R_{15''}$ or —CO—O—$OR_{15}R_{15'}$—C(—$CH_2$)—$R_{15''}$;

A is —CO—$CR_{16}$—CH—$R_{17}$;

$R_4$ is independently $C_1$-$C_{18}$ alkyl; $C_3$-$C_{18}$ alkenyl; $C_7$-$C_{11}$ phenylalkyl; $C_5$-$C_{12}$ cycloalkyl; or $C_3$-$C_{50}$ alkyl that is interrupted by one or more of —O—, —NH—, —$NR_7$— and —S— and is unsubstituted or substituted by OH, phenoxy and/or by $C_7$-$C_{18}$ alkylphenoxy; or $C_2$-$C_{12}$ hydroxyalkyl;

$R_5$ is independently H; $C_1$-$C_{18}$ alkyl; $C_1$-$C_{18}$ alkyl substituted by COOH or by $COOR_4$; $C_2$-$C_{18}$ alkenyl; $C_2$-$C_{18}$ alkenyl substituted by COOH or by $COOR_4$; $C_5$-$C_{12}$ cycloalkyl; phenyl; $C_7$-$C_{11}$ phenylalkyl; $C_6$-$C_{15}$ bicycloalkyl; $C_6$-$C_{15}$ bicycloalkenyl; or $C_6$-$C_{15}$ tricycloalkyl;

$R_6$ is independently $C_1$-$C_{18}$ alkyl; $C_3$-$C_{18}$ alkenyl; phenyl; $C_7$-$C_{11}$ phenylalkyl; or $C_5$-$C_{12}$ cycloalkyl;

$R_7$ and $R_8$ are independently $C_1$-$C_{12}$ alkyl; $C_3$-$C_{12}$ alkoxyalkyl; $C_4$-$C_{16}$ dialkylaminoalkyl; or $C_5$-$C_{12}$ cycloalkyl; or together form $C_3$-$C_9$-alkylene, -oxaalkylene or -azaalkylene;

$R_9$ is independently $C_1$-$C_{18}$ alkyl; $C_2$-$C_{18}$ alkenyl; phenyl; $C_5$-$C_{12}$ cycloalkyl; $C_7$-$C_{11}$ phenylalkyl; $C_6$-$C_{15}$ bicycloalkyl, $C_6$-$C_{15}$ bicycloalkyl-alkyl, $C_6$-$C_{15}$ bicycloalkenyl, or $C_6$-$C_{15}$ tricycloalkyl;

$R_{10}$ is independently $C_1$-$C_{12}$ alkyl; phenyl; naphthyl or $C_7$-$C_{14}$ alkylphenyl;

$R_{11}$ and $R_{22}$ are independently H; $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; $C_7$-$C_{14}$ alkylphenyl; halogen; $C_1$-$C_{18}$ haloalkyl; or $C_1$-$C_{18}$ alkoxy;

$R_{12}$ is independently $C_1$-$C_{18}$ alkyl; $C_3$-$C_{18}$ alkenyl; phenyl; phenyl substituted by one to three of the radicals $C_1$-$C_8$ alkyl, $C_1$-$C_8$ alkoxy, $C_3$-$C_8$ alkenyloxy, halogen and trifluoromethyl; $C_7$-$C_{11}$-phenylalkyl; $C_5$-$C_{12}$ cycloalkyl; $C_6$-$C_{15}$ tricycloalkyl; $C_6$-$C_{15}$ bicycloalkyl; $C_6$-$C_{15}$ bicycloalkyl-alkyl; $C_6$-$C_{15}$ bicycloalkenyl-alkyl; —CO—$R_5$; or $C_3$-$C_{50}$ alkyl that is interrupted by one or more of —O—, —NH—, —$NR_7$— and —S— and is unsubstituted or substituted by OH, phenoxy and/or by $C_7$-$C_{18}$ alkylphenoxy;

$R_{13}$ and $R_{13'}$ are independently H; $C_1$-$C_{18}$ alkyl; or phenyl;

$R_{14}$ is independently $C_1$-$C_{18}$ alkyl; $C_3$-$C_{12}$ alkoxyalkyl; phenyl; or phenyl-$C_1$-$C_4$ alkyl;

$R_{15}$, $R_{15'}$ and $R_{15''}$ are independently H or $CH_3$;

$R_{16}$ is independently H; —$CH_2$—COO—$R_4$; $C_1$-$C_4$ alkyl; or CN;

$R_{17}$ is independently H; —$COOR_4$; $C_1$-$C_{17}$ alkyl; or phenyl;

$R_{22'}$ has one of the meanings of $R_{11}$; or is $NH_2$, $NHR_7$, NH—CO—$R_5$; —S—$R_3$, —$N(R_7)(R_8)$ or $OR_3$;

X is independently —NH—; —$NR_7$—; —O—; —NH—$(CH_2)_p$—NH—; or —O—$(CH_2)_q$—NH—;

and the indices are as follows: m is a number from 0 to 19; n is a number from 1 to 8; p is a number from 0 to 4; and q is a number from 2 to 4.

Preferably $R_{11}$ and $R_{22}$ are H.

Of interest is $R_{22'}$ that is —$OR_3$, especially —OH.

Examples of aromatic carbocyclic fused ring systems comprising at least 3 rings are radicals of anthracene, phenanthrene, fluoranthene, pyrene, chrysene, benzanthracene, dibenzanthracene, benzofluoranthene, benzopyrene, indenopyrene and benzoperylene, preferably phenanthrene, fluoranthene and pyrene, most preferably fluoranthene and pyrene.

For instance, an aromatic carbocyclic fused ring system comprising at least 3 rings means that this ring system comprises at least 3 aromatic rings, in particular at least three aromatic fused rings.

Examples of aromatic hetero ring systems comprising one or more rings are thienyl, benzo[b]thienyl, naphtho[2,3-b]thienyl, thianthrenyl, furyl, benzofuryl, isobenzofuryl, dibenzofuryl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, beta-carbolinyl, phenanthridinyl, acridinyl, perimidinyl, phenanthrolinyl, phenazinyl, isothiazolyl, phenothiazinyl, isoxazolyl, furazanyl and phenoxazinyl.

Within the scope of the definitions given, alkyl are branched or unbranched alkyl, e.g. methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

For example $C_5$-$C_{12}$ cycloalkyl includes notably cyclopentyl, cyclohexyl, cycloheptyl, cyclooctyl, cyclononyl, cyclodecyl, cycloundecyl and cyclododecyl. Cyclopentyl, cyclohexyl, cyclooctyl and cyclododecyl are preferred.

Alkenyl includes, within the scope of the definitions given, inter alia allyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl and n-octadec-4-enyl.

Substituted alkyl, cycloalkyl or phenyl radicals may be mono- or poly-substituted and may carry substituents at the binding carbon atom (in the a-position) or at other carbon atoms; if a substituent is bonded by a hetero atom (such as e.g. alkoxy), it is preferably not in the a-position and the substituted alkyl radical comprises 2, especially 3, or more carbon atoms. A plurality of substituents is preferably bonded to different carbon atoms.

Alkyl interrupted by —O—, —NH—, —$NR_7$— and/or by —S— may be interrupted by one or more of the mentioned groups, in each case normally one group being inserted into a bond and hetero-hetero bonds, such as, for example, O—O, S—S, NH—NH etc. not occurring; if the interrupted alkyl is, in addition, substituted, the substituents are not normally in the a-position with respect to the hetero atom. If a plurality of interrupting groups of the type —O—, —NH—, —$NR_7$— and —S— occurs in a radical, those groups are usually identical.

Hydroxyalkyl means an alkyl group substituted by at least one hydroxyl group.

For instance alkoxy, phenoxy, alkenyloxy and cycloalkoxy mean the group —OZ, wherein Z is alkyl, phenyl, alkenyl and cycloalkyl respectively.

Phenylalkyl comprises within the limits of carbon atoms given, for example, benzyl, a-methylbenzyl, phenylethyl, phenylpropyl, phenylbutyl, phenylpentyl and phenylhexyl; whereby benzyl, a-methylbenzyl and a,a-dimethylbenzyl are preferred.

Alkylphenyl and alkylphenoxy are alkyl-substituted phenyl and phenoxy, respectively.

A halogen substituent is —F, —Cl, —Br or —I; —F or —Cl, and especially —Cl, is preferred. Haloalkyl is especially chloroalkyl or trifluoromethyl; trifluoromethyl is of particular importance industrially.

Alkylene is e.g. methylene, ethylene, propylene, butylene, pentylene, hexylene, etc. The alkyl chain may also be branched in that case, such as e.g. in isopropylene.

$C_4$-$C_{12}$ Cycloalkenyl is e.g. 2-cyclobuten-1-yl, 2-cyclopenten-1-yl, 2,4-cyclopentadien-1-yl, 2-cyclohexen-1-yl, 2-cyclohepten-1-yl or 2-cyclooctene-1-yl.

$C_6$-$C_{15}$ Bicycloalkyl is e.g. bornyl, norbornyl or 2.2.2-bicyclooctyl. Bornyl and norbornyl, and especially bornyl and norborn-2-yl, are preferred.

$C_6$-$C_{15}$ Bicycloalkoxy is, for example, bornyloxy or norborn-2-yl-oxy.

$C_6$-$C_{15}$ Bicycloalkyl-alkyl or -alkoxy is alkyl or alkoxy substituted by bicycloalkyl, the total number of carbon atoms being 6-15; examples are norbornane-2-methyl and norbornane-2-methoxy.

$C_6$-$C_{15}$ Bicycloalkenyl is e.g. norbornenyl or norbornadienyl. Norbornenyl, and especially norborn-5-enyl, is preferred.

$C_6$-$C_{15}$ Bicycloalkenyl-alkoxy is alkoxy substituted by bicycloalkenyl, the total number of carbon atoms being 6-15; an example is norborn-5-enyl-2-methoxy.

$C_6$-$C_{15}$-Tricycloalkyl is e.g. 1-adamantyl or 2-adamantyl; 1-adamantyl is preferred.

$C_6$-$C_{15}$-Tricycloalkoxy is e.g. adamantyloxy.

$C_3$-$C_{12}$ Heteroaryl is preferably pyridinyl, pyrimidinyl, triazinyl, pyrrolyl, furanyl, thiophenyl or quinolinyl.

Among compounds (T) which can be used in the context of the present invention, mention can be notably made of compounds complying with any of formulae below:

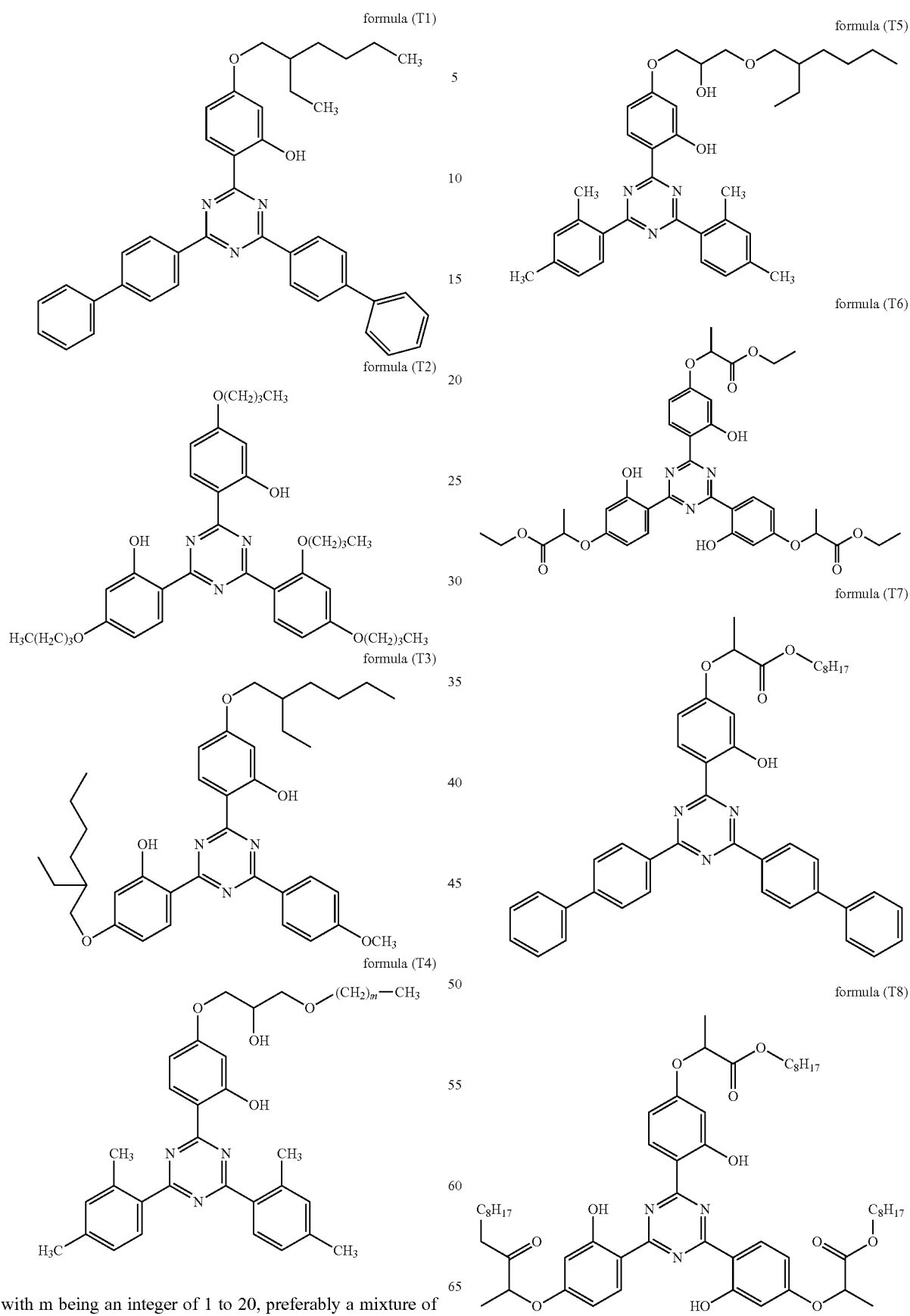
with m being an integer of 1 to 20, preferably a mixture of 11 and 12;

formula (T9)

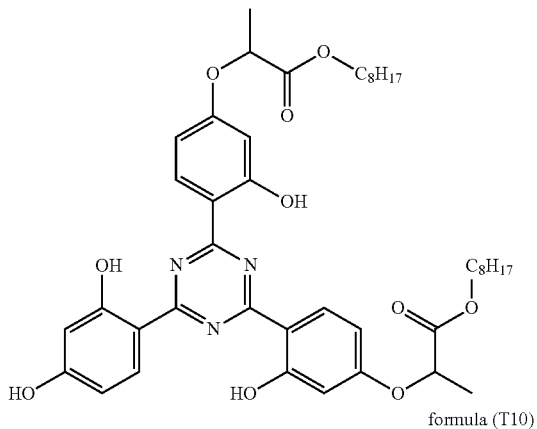

formula (T10)

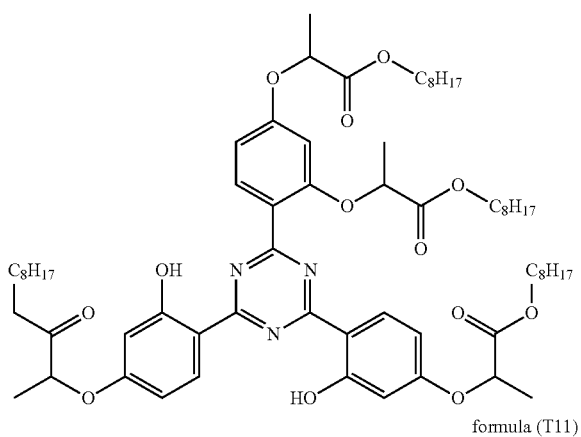

formula (T11)

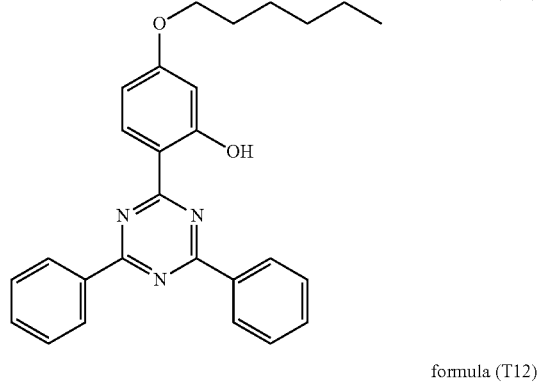

formula (T12)

formula (T13)

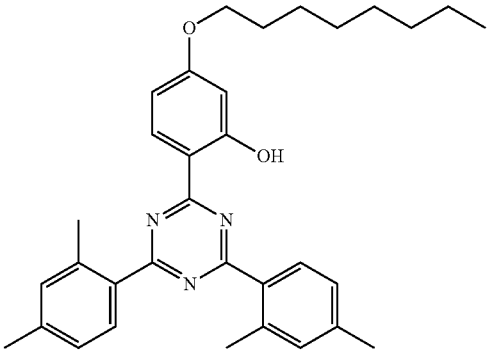

A single compound (T) can be used or mixtures of more than one compound (T) can be equally employed.

Preferred compounds (T) are compounds complying with any of formulae (T1), (T2) and (T11), as above detailed. These compounds are notably available commercially under trade name TINUVIN® 1600, TINUVIN® 460 and TINUVIN® 1577 UV stabilizer.

According to certain embodiments, absorber (UV) is at least one hydroxylphenyl-triazine compound [compound (T)], as above detailed.

Cyanoacrylate compounds [compounds (CN)] are compounds of formula (VI):

wherein:

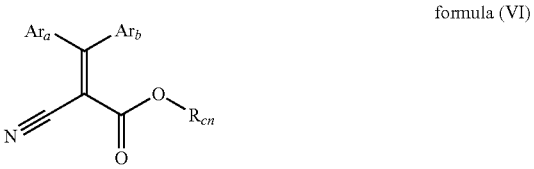

formula (VI)

$Ar_a$ and $Ar_b$, equal to or different from each other, are independently aromatic groups, said aromatic groups possibly comprising one or more than one heteroatom;

$R_{cn}$ is a hydrocarbon group possibly comprising one or more than one heteroatom.

Preferably, compound (CN) complies with formula (VII):

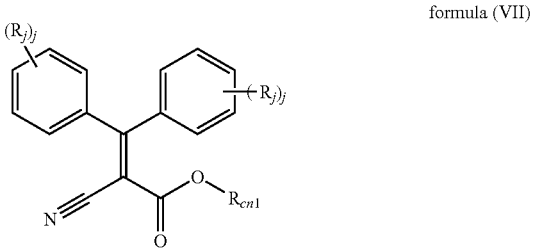

formula (VII)

wherein:

$R_{cn1}$ is independently $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; $C_7$-$C_{14}$ alkylphenyl; or is a group of formula:

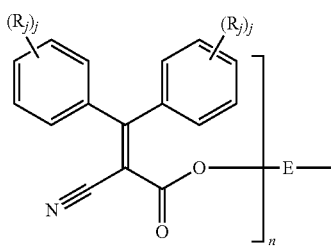

wherein n is an integer of 1 to 4, and E is a hydrocarbon group, preferably an aliphatic group;

j is zero or an integer of 0 to 4;

each of $R_j$, equal to or different from each other, is independently $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; $C_7$-$C_{14}$ alkylphenyl; halogen; $C_1$-$C_{18}$ haloalkyl; or $C_1$-$C_{18}$ alkoxy; or is $NH_2$, $NHR_{cn2}$, —$N(R_{cn2})(R_{cn3})$, NH—CO—$R_{cn4}$; —S—$R_{cn5}$, or —$OR_{cn5}$; wherein:

$R_{cn2}$ and $R_{cn3}$, equal to or different from each other, are independently $C_1$-$C_{12}$ alkyl; $C_3$-$C_{12}$ alkoxyalkyl; $C_4$-$C_{16}$ dialkylaminoalkyl; or $C_5$-$C_{12}$ cycloalkyl; or, when simultaneously present, may together form $C_3$-$C_9$-alkylene, -oxaalkylene or -azaalkylene;

$R_{cn4}$ is independently H; $C_1$-$C_{18}$ alkyl; $C_1$-$C_{18}$ alkyl substituted by COOH or by $COOR_{cn2}$; $C_2$-$C_{18}$ alkenyl; $C_2$-$C_{18}$ alkenyl substituted by COOH or by $COOR_{cn2}$; $C_5$-$C_{12}$ cycloalkyl; phenyl; $C_7$-$C_{11}$ phenylalkyl; $C_6$-$C_{15}$ bicycloalkyl; $C_6$-$C_{15}$ bicycloalkenyl; or $C_6$-$C_{15}$ tricycloalkyl;

$R_{cn5}$ is independently H, $C_1$-$C_{18}$ alkyl; $C_5$-$C_{12}$ cycloalkyl; $C_3$-$C_{18}$ alkenyl; phenyl; $C_1$-$C_{18}$ alkyl that is substituted by phenyl, OH, $C_1$-$C_{18}$ alkoxy, $C_5$-$C_{12}$ cycloalkoxy, $C_3$-$C_{18}$ alkenyloxy, halogen, —COOH, —$COOR_{cn2}$, —O—CO—$R_{cn2}$, —O—CO—O—$R_{cn2}$, —CO—$NH_2$, —CO—$NHR_{cn2}$, —CO—$N(R_{cn2})(R_{cn3})$, CN, $NH_2$, $NHR_{cn2}$, —$N(R_{cn2})(R_{cn3})$, —NH—CO—$R_{cn2}$, phenoxy, $C_1$-$C_{18}$ alkyl-substituted phenoxy, phenyl-$C_1$-$C_4$-alkoxy, $C_6$-$C_{15}$ bicycloalkoxy, $C_6$-$C_{15}$ bicycloalkyl-alkoxy, $C_6$-$C_{15}$ bicycloalkenyl-alkoxy and/or by $C_6$-$C_{15}$-tricycloalkoxy; $C_5$-$C_{12}$ cycloalkyl that is substituted by OH, $C_1$-$C_4$ alkyl, $C_2$-$C_6$ alkenyl and/or by —O—CO—$R_{cn2}$; —CO—$R_{cn2}$ or —$SO_2$—$R_{cn2}$; or $C_3$-$C_{50}$ alkyl that is interrupted by one or more oxygen atoms and is unsubstituted or substituted by OH, phenoxy and/or by $C_7$-$C_{18}$ alkylphenoxy.

Among compounds (CN) which can be used in the context of the present invention, mention can be notably made of compounds complying with any of formulae below:

formula (CN1)

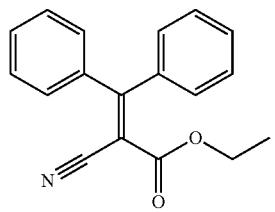

formula (CN2)

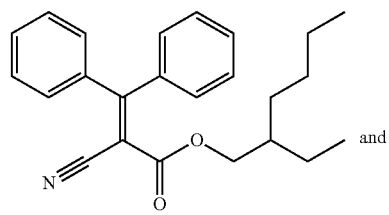

and formula (CN3)

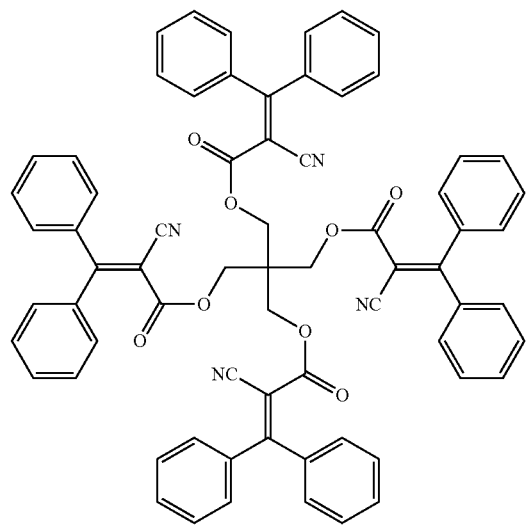

Compound (CN3) has been found particularly advantageous. This compound is notably commercially available under tradename Uvinul® 3030.

According to certain embodiments, absorber (UV) is at least one cyanoacrylate compound [compound (CN)], as above detailed.

Benzoxazin-4-one compounds [compounds (BX)] are compounds of formula (VIII):

formula (VIII)

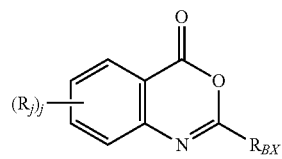

wherein:

$R_{BX}$ is independently $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; $C_7$-$C_{14}$ alkylphenyl; or is a group of formula:

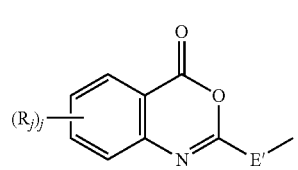

wherein E' is a hydrocarbon group, preferably an aromatic group, more preferably a phenyl group;

j is zero or an integer of 0 to 4;

each of $R_j$, equal to or different from each other, is independently $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; $C_7$-$C_{14}$ alkylphenyl; halogen; $C_1$-$C_{18}$ haloalkyl; or $C_1$-$C_{18}$ alkoxy; or is $NH_2$, $NHR_{cn2}$, —$N(R_{cn2})(R_{cn3})$, NH—CO—$R_{cn4}$; —S—$R_{cn5}$, or —$OR_{cn5}$; wherein:

$R_{cn2}$ and $R_{cn3}$, equal to or different from each other, are independently $C_1$-$C_{12}$ alkyl; $C_3$-$C_{12}$ alkoxyalkyl; $C_4$-$C_{16}$ dialkylaminoalkyl; or $C_5$-$C_{12}$ cycloalkyl; or, when simultaneously present, may together form $C_3$-$C_9$-alkylene, -oxaalkylene or -azaalkylene;

$R_{cn4}$ is independently H; $C_1$-$C_{18}$ alkyl; $C_1$-$C_{18}$ alkyl substituted by COOH or by $COOR_{cn2}$; $C_2$-$C_{18}$ alkenyl; $C_2$-$C_{18}$ alkenyl substituted by COOH or by $COOR_{cn2}$; $C_5$-$C_{12}$ cycloalkyl; phenyl; $C_7$-$C_{11}$ phenylalkyl; $C_6$-$C_{15}$ bicycloalkyl; $C_6$-$C_{15}$ bicycloalkenyl; or $C_6$-$C_{15}$ tricycloalkyl;

$R_{cn5}$ is independently H, $C_1$-$C_{18}$ alkyl; $C_5$-$C_{12}$ cycloalkyl; $C_3$-$C_{18}$ alkenyl; phenyl; $C_1$-$C_{18}$ alkyl that is substituted by phenyl, OH, $C_1$-$C_{18}$ alkoxy, $C_5$-$C_{12}$ cycloalkoxy, $C_3$-$C_{18}$ alkenyloxy, halogen, —COOH, —$COOR_{cn2}$, —O—CO—$R_{cn2}$, —O—CO—O—$R_{cn2}$, —CO—$NH_2$, —CO—$NHR_{cn2}$, —CO—$N(R_{cn2})(R_{cn3})$, CN, $NH_2$, $NHR_{cn2}$, —$N(R_{cn2})(R_{cn3})$, —NH—CO—$R_{cn2}$, phenoxy, $C_1$-$C_{18}$ alkyl-substituted phenoxy, phenyl-$C_1$-$C_4$-alkoxy, $C_6$-$C_{15}$ bicycloalkoxy, $C_6$-$C_{15}$ bicycloalkyl-alkoxy, $C_6$-$C_{15}$ bicycloalkenyl-alkoxy and/or by $C_6$-$C_{15}$-tricycloalkoxy; $C_5$-$C_{12}$ cycloalkyl that is substituted by OH, $C_1$-$C_4$ alkyl, $C_2$-$C_6$ alkenyl and/or by —O—CO—$R_{cn2}$; —CO—$R_{cn2}$ or —$SO_2$—$R_{cn2}$; or $C_3$-$C_{50}$ alkyl that is interrupted by one or more oxygen atoms and is unsubstituted or substituted by OH, phenoxy and/or by $C_7$-$C_{18}$ alkylphenoxy.

Among compounds (BX) which can be used in the context of the present invention, mention can be notably made of compounds complying with any of formulae below:

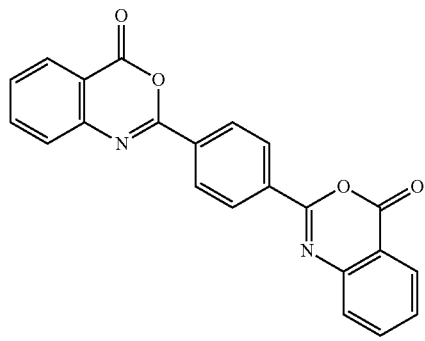

formula (BX1)

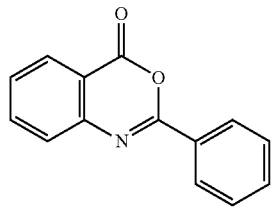

formula (BX2)

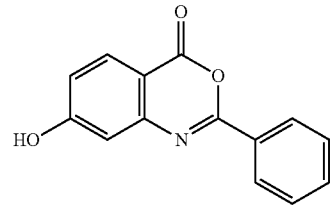

formula (BX3)

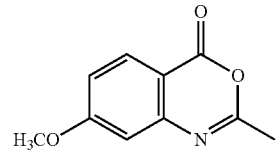

formula (BX4)

Compound (BX1) has been found particularly advantageous. This compound is notably commercially available under tradename Cyasorb® UV-3638F.

According to certain embodiments, absorber (UV) is at least one benzoxazin-4-one compound [compound (BX)], as above detailed.

Benzotriazole compounds [compounds (BT)] are compounds of formula (IX):

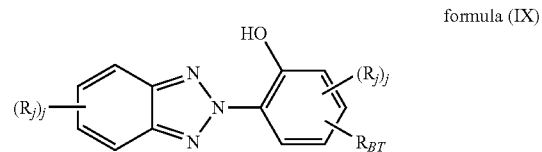

formula (IX)

wherein:

$R_{BT}$ is independently H; $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; or $C_7$-$C_{14}$ alkylphenyl; or is a group of formula:

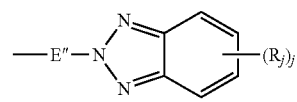

wherein E" is a hydrocarbon group, preferably an aromatic group, more preferably a group of formula:

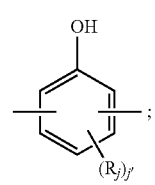

j is zero or an integer of 0 to 4; j' is zero or an integer of 0 to 3;

each of $R_j$, equal to or different from each other, is independently $C_1$-$C_{18}$ alkyl; $C_3$-$C_6$ alkenyl; $C_5$-$C_{12}$ cycloalkyl; phenyl; naphthyl; biphenylyl; $C_7$-$C_{11}$ phenylalkyl; $C_7$-$C_{14}$ alkylphenyl; halogen; $C_1$-$C_{18}$ haloalkyl; or $C_1$-$C_{18}$ alkoxy; or is $NH_2$, $NHR_{cn2}$, —$N(R_{cn2})(R_{cn3})$, NH—CO—$R_{cn4}$; —S—$R_{cn5}$, or —$OR_{cn5}$; wherein:

$R_{cn2}$ and $R_{cn3}$, equal to or different from each other, are independently $C_1$-$C_{12}$ alkyl; $C_3$-$C_{12}$ alkoxyalkyl; $C_4$-$C_{16}$ dialkylaminoalkyl; or $C_5$-$C_{12}$ cycloalkyl; or, when simultaneously present, may together form $C_3$-$C_9$-alkylene, -oxaalkylene or -azaalkylene;

$R_{cn4}$ is independently H; $C_1$-$C_{18}$ alkyl; $C_1$-$C_{18}$ alkyl substituted by COOH or by COOR$_{cn2}$; $C_2$-$C_{18}$ alkenyl; $C_2$-$C_{18}$ alkenyl substituted by COOH or by COOR$_{cn2}$; $C_5$-$C_{12}$ cycloalkyl; phenyl; $C_7$-$C_{11}$ phenylalkyl; $C_6$-$C_{15}$ bicycloalkyl; $C_6$-$C_{15}$ bicycloalkenyl; or $C_6$-$C_{15}$ tricycloalkyl;

$R_{cn5}$ is independently H, $C_1$-$C_{18}$ alkyl; $C_5$-$C_{12}$ cycloalkyl; $C_3$-$C_{18}$ alkenyl; phenyl; $C_1$-$C_{18}$ alkyl that is substituted by phenyl, OH, $C_1$-$C_{18}$ alkoxy, $C_5$-$C_{12}$ cycloalkoxy, $C_3$-$C_{18}$ alkenyloxy, halogen, —COOH, —COOR$_{cn2}$, —O—CO—R$_{cn2}$, —O—CO—O—R$_{cn2}$, —CO—NH$_2$, —CO—NHR$_{cn2}$, —CO—N(R$_{cn2}$)(R$_{cn3}$), CN, NH$_2$, NHR$_{cn2}$, —N(R$_{cn2}$)(R$_{cn3}$), —NH—CO—R$_{cn2}$, phenoxy, $C_1$-$C_{18}$ alkyl-substituted phenoxy, phenyl-$C_1$-$C_4$-alkoxy, $C_6$-$C_{15}$ bicycloalkoxy, $C_6$-$C_{15}$ bicycloalkyl-alkoxy, $C_6$-$C_{15}$ bicycloalkenyl-alkoxy and/or by $C_6$-$C_{15}$-tricycloalkoxy; $C_5$-$C_{12}$ cycloalkyl that is substituted by OH, $C_1$-$C_4$ alkyl, $C_2$-$C_6$ alkenyl and/or by —O—CO—R$_{cn2}$; —CO—R$_{cn2}$ or —SO$_2$—R$_{cn2}$; or $C_3$-$C_{50}$ alkyl that is interrupted by one or more oxygen atoms and is unsubstituted or substituted by OH, phenoxy and/or by $C_7$-$C_{18}$ alkylphenoxy.

Among compounds (BT) which can be used in the context of the present invention, mention can be notably made of compounds complying with any of formulae below:

formula (BT1)

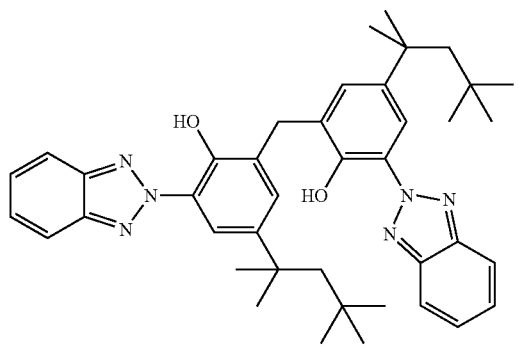

formula (BT2)

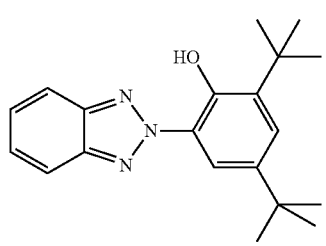

formula (BT3)

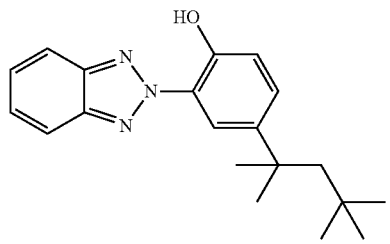

formula (BT4)

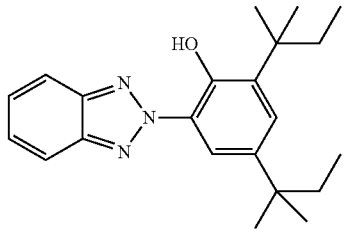

formula (BT5)

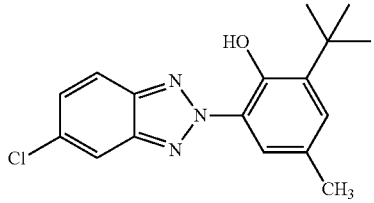

formula (BT6)

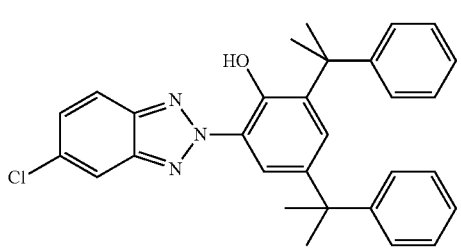

Of above mentioned compounds (BT), compound of formula (BT1) has been found particularly advantageous. This compound is notably commercially available under tradename TINUVIN® 360.

According to certain embodiments, absorber (UV) is at least one benzotriazole compound [compounds (BT)], as above detailed.

The amount of absorber (UV) used in the inventive composition is not particularly limited, provided that the same is used in an effective amount for delivering the expected UV resistance; one of ordinary skills in the art will be able to determine by routine experiments optimized amounts. Generally, nevertheless, the amount of absorber (UV) will be of at least 0.001, preferably at least 0.01, more preferably at least 0.1 weight parts per 100 weight parts of polymer (P).

It is also further understood that the amount of absorber (UV) will be generally of at most 10, preferably at least 8, more preferably at least 5 weight parts per 100 weight parts of polymer (P).

As per the compound (B), this basic compound is selected from the group consisting of (i) basic oxides and hydroxides of divalent metals and (ii) salts of a weak acid.

The expression "basic oxide" is used within the context of the present invention according to its usual meaning, i.e. to designate oxides which react in water to generate hydroxides providing for an alkaline pH of resulting solution.

Mixed oxides comprising aforementioned "basic oxide of divalent metals" components, possibly in combination with other oxides, are equally encompassed by this expression.

The expression "weak acid" is used within the context of the present invention according to its usual meaning, i.e. to designate acids which do not entirely dissociate in water; generally weak acids suitable to the purpose of being used under the form of salts in the composition of the invention are acids possessing a pKa of 3 or more.

The compound (B) is preferably selected from (j) basic oxides of divalent metals, and mixed oxides comprising the same, in particular from oxides of alkali earth metals and oxides of Zn and Pb(II), most preferably selected from MgO, CaO, ZnO, PbO; and from (jj) stearates, benzoates, carbonates, oxalates and phosphites, in particular stearates, benzoates, carbonates, oxalates and phosphites of an alkali or alkali earth metal or of Pb or of Zn.

Compounds (B) which have been found particularly beneficial within the frame of the present invention are in particular MgO and CaO, and mixed oxides comprising the same, and most particularly MgO, $(Al_2O_3)(MgO)$, and CaO.

A single compound (B) can be used or mixtures of more than one compound (B) can be equally employed.

The amount of compound (B) used in the inventive composition is not particularly limited, provided that the same is used in an effective amount for delivering the expected UV resistance; one of ordinary skills in the art will be able to determine by routine experiments optimized amounts. Generally, nevertheless, the amount of compound (B) will be of at least 0.001, preferably at least 0.01, more preferably at least 0.1 weight parts per 100 weight parts of polymer (P).

It is also further understood that the amount of compound (B) will be generally of at most 10, preferably at least 8, more preferably at least 5 weight parts per 100 weight parts of polymer (P).

For the purpose of the invention, the expression "aromatic sulfone polymer [polymer (P)]" is intended to denote any polymer, at least 50% moles of the recurring units thereof comprise at least one group of formula —Ar—$SO_2$—Ar'— [recurring units (Rep)], with Ar and Ar', equal to or different from each other, being aromatic groups.

In a first embodiment of said invention, said recurring units $R_{SP}$ of aromatic sulfone polymer (P) are recurring units ($R_{SP-1}$), in their imide form ($R_{SP-1}$-A) and/or amic acid forms [($R_{SP-1}$—B) and ($R_{SP-1}$—C)]

($R_{SP-1}$-A)

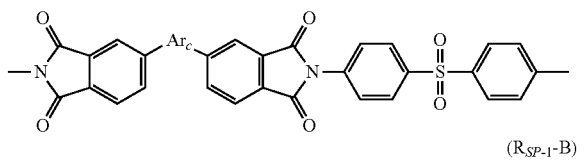

($R_{SP-1}$-B)

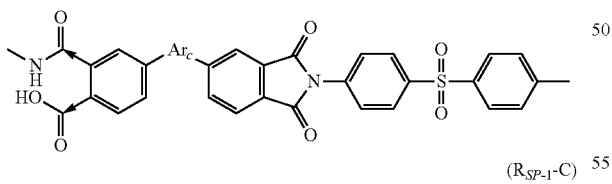

($R_{SP-1}$-C)

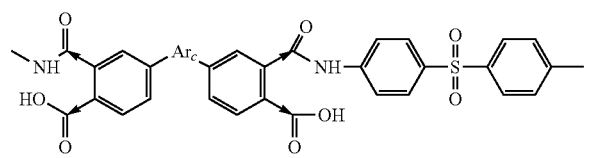

wherein:
the → denotes isomerism so that in any recurring unit the groups to which the arrows point may exist as shown or in an interchanged position;

$Ar_C$ is selected from the group consisting of:

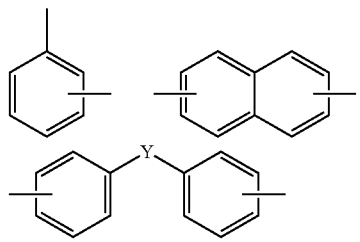

and corresponding optionally substituted structures, with Y being —O—, —C(O)—, —$(CH_2)_n$—, —$C(CF_3)_2$—, —$(CF_2)_n$—, with n being an integer from 1 to 5, and mixtures thereof.

In a second preferred embodiment of the invention, recurring units ($R_{SP}$) of the polymer (P) preferably are recurring units ($R_{SP-2}$) complying with formula:

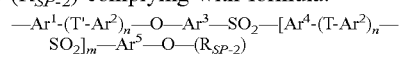

wherein:
$Ar^1$, $Ar^2$, $Ar^3$, $Ar^4$, and $Ar^5$, equal to or different from each other and at each occurrence, are independently an aromatic mono- or polynuclear group;

T and T', equal to or different from each other and at each occurrence, is independently a bond or a divalent group optionally comprising one or more than one heteroatom; preferably T' is selected from the group consisting of a bond, —$CH_2$—, —C(O)—, —$C(CH_3)_2$—, —$C(CF_3)_2$—, —$C(=CCl_2)$—, —$SO_2$—, —$C(CH_3)$ ($CH_2CH_2COOH$)—, and a group of formula:

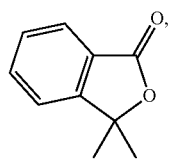

and
preferably T is selected from the group consisting of a bond, —$CH_2$—, —C(O)—, —$C(CH_3)_2$—, —$C(CF_3)_2$—, —$C(=CCl_2)$—, —$C(CH_3)(CH_2CH_2COOH)$—, and a group of formula:

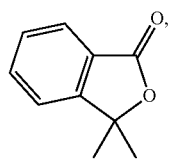

and
n and m, equal to or different from each other, are independently zero or an integer of 1 to 5.

The sulfone polymer of this second preferred embodiment is an ether sulfone polymer.

Aromatic sulfone polymer (SP) according to the second preferred embodiment of the invention comprises at least 50% moles, preferably 70% moles, more preferably 75% moles of recurring units ($R_{SP-2}$), still more preferably, it contains no recurring unit other than recurring units ($R_{SP-2}$), as above detailed.

Recurring units ($R_{SP-2}$) of the polymer (P) according to this preferred embodiment can be notably selected from the group consisting of those of formulae (S-A) to (S-D) herein below:

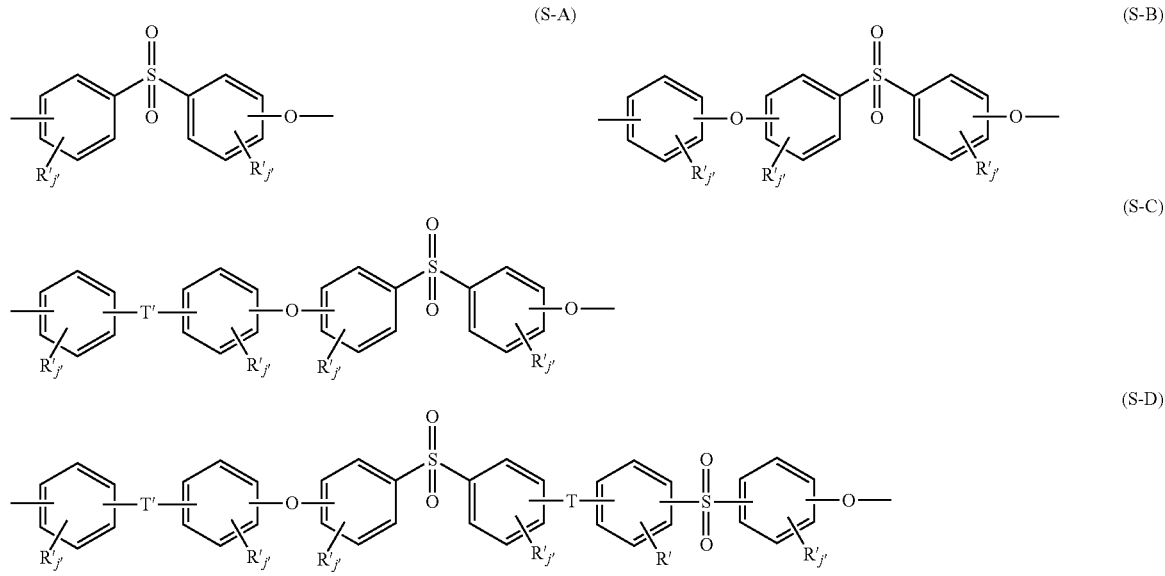

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

T and T', equal to or different from each other are a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

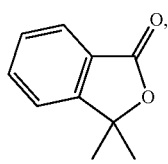

and preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

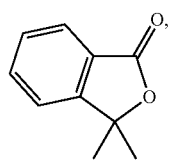

and j' is zero or is an integer from 0 to 4.

The aromatic sulfone polymer (P) has typically a glass transition temperature of advantageously at least 150° C., preferably at least 160° C., more preferably at least 175° C.

Recurring units ($R_{SP}$) of formula (S-D) are preferably selected from the group consisting of the following recurring units:

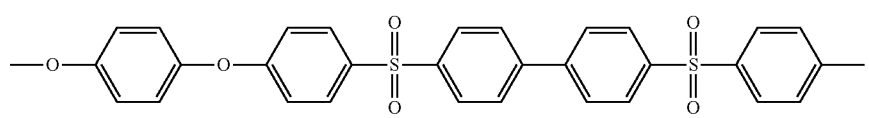

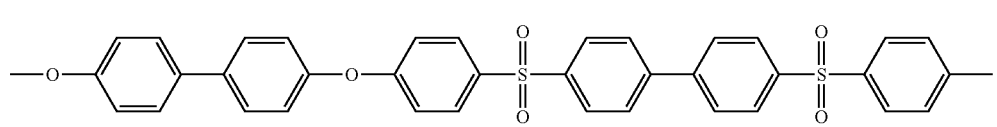

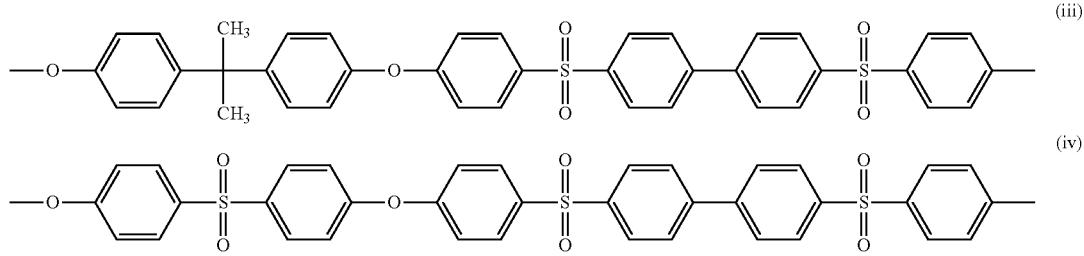

and mixtures thereof.

Recurring units ($R_{SP}$) complying with formula (S—C), as above detailed, are preferably selected from the group consisting of the following units:

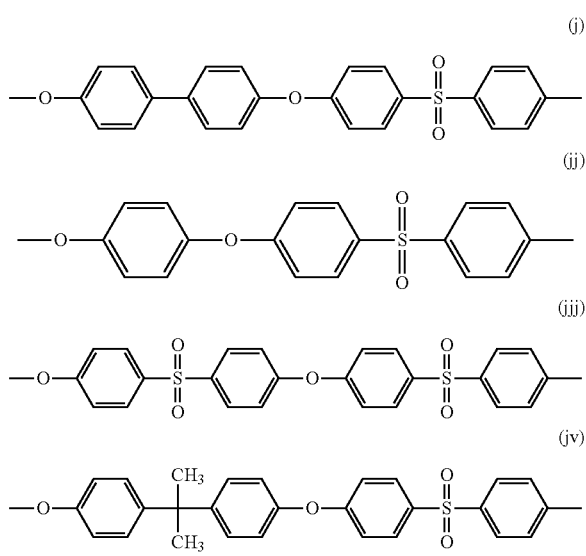

and mixtures thereof.

Good results were obtained with aromatic sulfone polymer (SP) the recurring units of which are recurring units (ii) (polybiphenyldisulfone, herein after), with aromatic sulfone polymer (SP) the recurring units of which are recurring units (j) (polyphenylsulfone or PPSU, hereinafter), with aromatic sulfone polymer (SP) the recurring units of which are recurring units (jj) (polyetherethersulfone, hereinafter), with aromatic sulfone polymer (SP) the recurring units of which are recurring units (jjj) and, optionally in addition, recurring units (jj) (polyethersulfone or PES, hereinafter), and with aromatic sulfone polymer (SP) the recurring units of which are recurring units (jv) and, optionally in addition, recurring units (jj) (polysulfone, or PSF hereinafter).

Polyphenylsulfone (PPSU) is notably available as RADEL® R PPSU from Solvay Specialty Polymers USA, L.L.C. Polysulfone (PSF) is notably available as UDEL® PSF from Solvay Specialty Polymers USA, L.L.C. Polyethersulfone (PES) is notably available as VERADEL® PES or as VIRANTAGE® r-PES from Solvay Specialty Polymers USA, L.L.C.

The composition of the invention advantageously comprises at least 30% weight, preferably at least 40% wt, more preferably at least 50% weight of polymer (P), with respect to the total weight of the composition.

According to certain embodiments, the composition can additionally comprise an additional polymer (P') different from polymer (P).

Suitable polymers (P') may have a completely amorphous structure, a partially or completely crystalline structure, or anything in between. Upon heating, these suitable thermoplastic polymers can melt, becoming sufficiently free flowing to permit processing using standard techniques (molding, extrusion, etc.). In certain embodiments, both amorphous and at least partially crystalline polymers (P') may be used.

Polymers (P') suitable for use in the composition of the present invention include, but are not limited to, aromatic polyimides (PI), in particular polyester-imides (PEI) and polyamide-imides (PAI), polyaryletherketones (PAEK), such as polyetheretherketones (PEEK) and polyetherketoneketones (PEKK), polyesters including aromatic moieties (PEs), liquid crystal polymers (LCP), semi-aromatic polyamides (PA), including polyamides derived from aromatic dicarboxylic acids (PPA) and polyamides derived from aromatic diamines (PXA), and polycarbonates (PC).

The skilled in the art will select among those classes, polymer compositions enabling fulfilment of requirements of final field of intended use, i.e. will select type, monomers compositions and/or other structural parameters of above mentioned polymers (PI), (PEI), (PAI), (PAEK), (PEEK), (PEKK), (LCP), (PA), (PPA), (PXA) and (PC) for satisfying the said requirements.

To the purpose of the present invention, "aromatic polyimide (PI)" is intended to denote any polymer comprising recurring units, more than 50% moles of said recurring units comprising at least one aromatic ring and at least one imide group, as such (formula 1A) or in its amic acid form (formula 1B) [recurring units ($R_{PI}$)]:

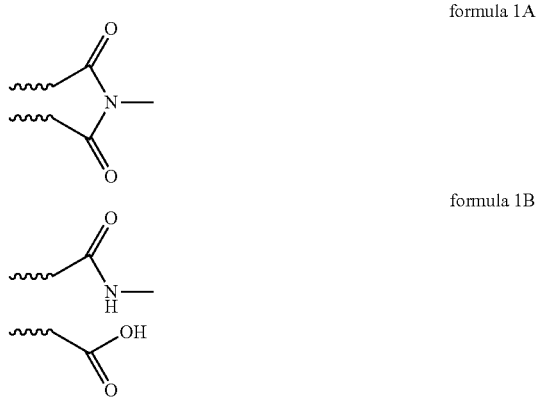

The imide group, as such or in its corresponding amic acid form, is advantageously linked to an aromatic ring, as illustrated below:

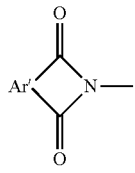

formula 2A

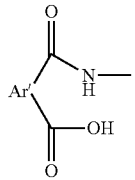

formula 2B whereas Ar' denotes a moiety containing at least one aromatic ring.

The imide group is advantageously present as condensed aromatic system, yielding a five- or six-membered heteroaromatic ring, such as, for instance, with benzene (phthalimide-type structure, formula 3) and naphthalene (naphthalimide-type structure, formula 4).

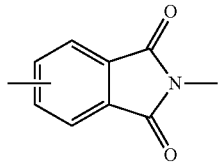

formula 3

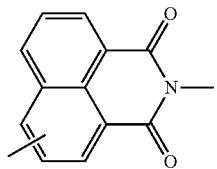

formula 4

The formulae here below depict examples of recurring units ($R_{PI}$) (formulae 5A to 5C):

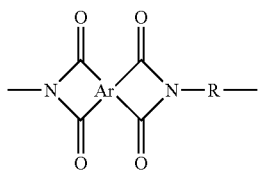

formula 5A

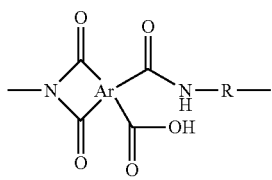

formula 5B

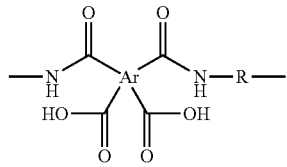

formula 5C wherein:

Ar represents an aromatic tetravalent group; typically Ar is selected from the group consisting of following structures:

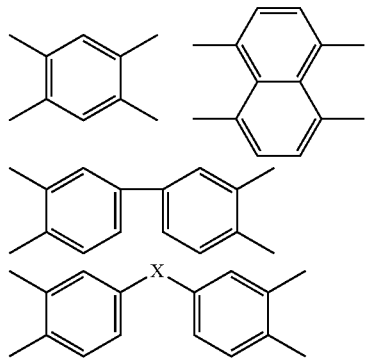

and corresponding optionally substituted structures, with X being —O—, —C(O)—, —CH$_2$—, —C(CF$_3$)$_2$—, —(CF$_2$)$_n$—, with n being an integer from 1 to 5;

R represents an aromatic divalent group; typically R is selected from the group consisting of following structures:

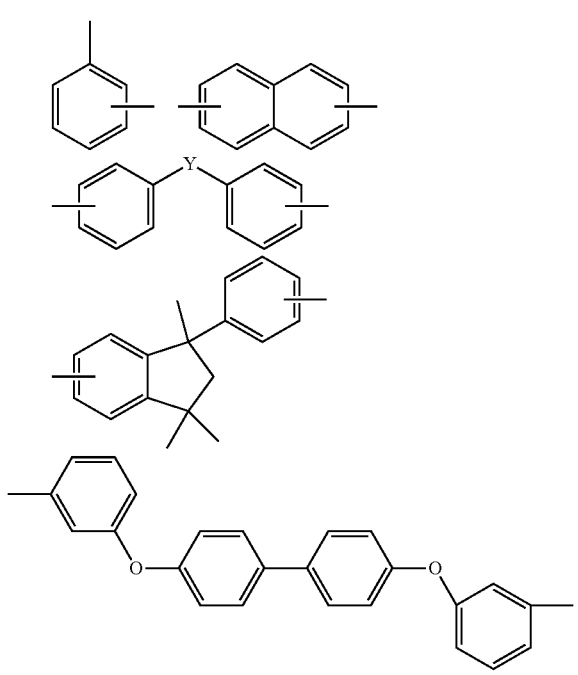

and corresponding optionally substituted structures, with Y being —O—, —S—, —SO$_2$—, —CH$_2$—, —C(O)—, —C(CF$_3$)$_2$—, —(CF$_2$)$_n$—, n being an integer from 0 to 5.

Polyimides commercialized by DuPont as VESPEL® polyimides or by Mitsui as AURUM® polyimides are suitable for the purpose of the invention.

The recurring units (R$_{PI}$) of the aromatic polyimide can comprise one or more functional groups other than the imide group, as such and/or in its amic acid form. Non limitative examples of polymers complying with this criterion are aromatic polyetherimides (PEI), aromatic polyesterimides and aromatic polyamide-imides (PAI).

To the purpose of the present invention, "aromatic polyesterimide" is intended to denote any polymer more than 50% moles of the recurring units comprise at least one aromatic ring, at least one imide group, as such and/or in its amic acid form, and at least one ester group [recurring units (R$_{PEI}$)]. Typically, aromatic polyesterimides are made by reacting at least one acid monomer chosen from trimellitic anhydride and trimellitic anhydride monoacid halides with at least one diol, followed by reaction with at least one diamine.

To the purpose of the present invention, "aromatic polyamide-imide (PAI)" is intended to denote any polymer comprising more than 50% moles of recurring units comprising at least one aromatic ring, at least one imide group, as such and/or in its amic acid form, and at least one amide group which is not included in the amic acid form of an imide group [recurring units (R$_{PAI}$)].

The recurring units (R$_{PAI}$) are advantageously chosen among:

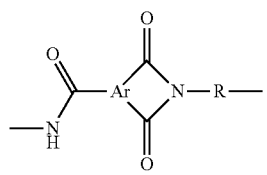

R$_{PAI}$-a (imide form)

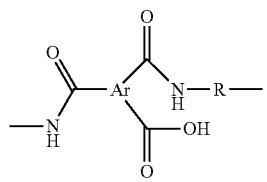

R$_{PAI}$-b (amic acid form)

wherein:
Ar is a trivalent aromatic group; typically Ar is selected from the group consisting of following structures:

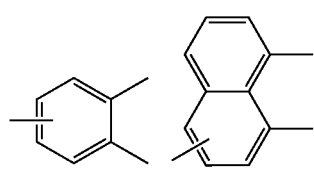

-continued

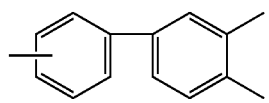

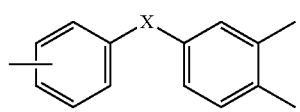

and corresponding optionally substituted structures, with
X being —O—, —C(O)—, —CH$_2$—, —C(CF$_3$)$_2$—, —(CF$_2$)$_n$—, with n being an integer from 1 to 5;
R is a divalent aromatic group; typically R is selected from the group consisting of following structures:

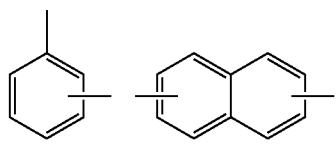

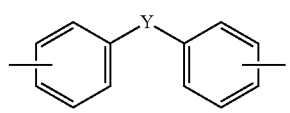

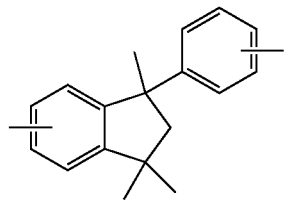

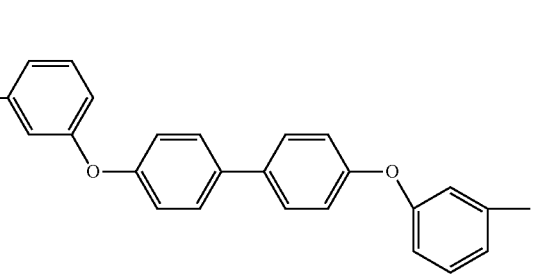

and corresponding optionally substituted structures, with Y being —O—, —S—, —SO$_2$—, —CH$_2$—, —C(O)—, —C(CF$_3$)$_2$—, —(CF$_2$)$_n$—, n being an integer from 0 to 5.

Preferably, the aromatic polyamide-imide comprises more than 50% of recurring units (R$_{PAI}$) comprising an imide group in which the imide group is present as such, like in recurring units (R$_{PAI}$-a), and/or in its amic acid form, like in recurring units (R$_{PAI}$-b).

Recurring units ($R_{PAI}$) are preferably chosen from recurring units (I), (m) and (n), in their amide-imide (a) or amide-amic acid (b) forms:

(l)

l-a

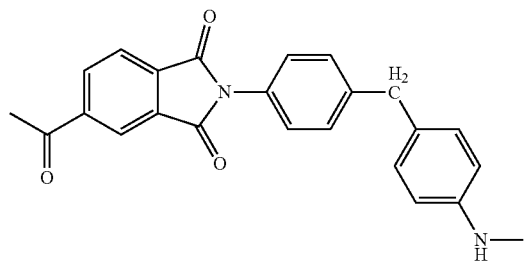

(amide-imide form)

l-b

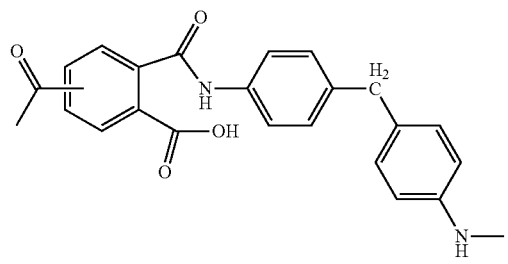

(amide-amic acid form)

wherein the attachment of the two amide groups to the aromatic ring as shown in (I-b) will be understood to represent the 1,3 and the 1,4 polyamide-amic acid configurations;

(m)

m-a

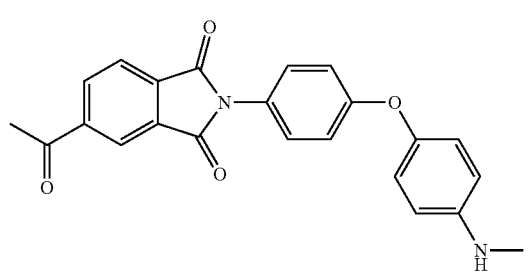

(amide-imide form)

m-b

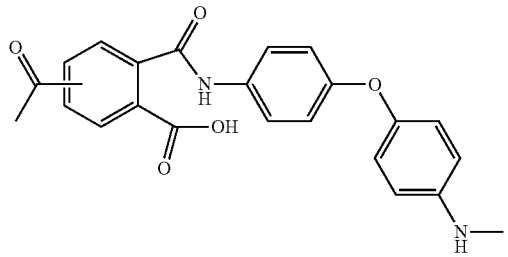

(amide-amic acid form)

wherein the attachment of the two amide groups to the aromatic ring as shown in (m-b) will be understood to represent the 1,3 and the 1,4 polyamide-amic acid configurations; and (n)

n-a

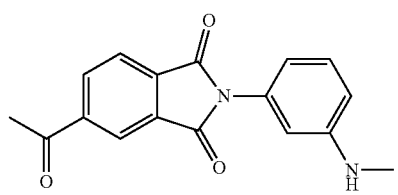

(amide-imide form)

n-b

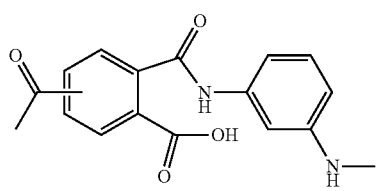

(amide-amic acid form)

wherein the attachment of the two amide groups to the aromatic ring as shown in (n-b) will be understood to represent the 1,3 and the 1,4 polyamide-amic acid configurations.

Very preferably, the aromatic polyamide-imide comprises more than 90% moles of recurring units ($R_{PAI}$). Still more preferably, it contains no recurring unit other than recurring units ($R_{PAI}$). Polymers commercialized by Solvay Specialty Polymers USA, L.L.C., as TORLON® polyamide-imides comply with this criterion.

For the purpose of the invention, the term "polyaryletherketone (PAEK)" is intended to denote any polymer, comprising recurring units, more than 50% moles of said recurring units are recurring units ($R_{PAEK}$) comprising a Ar—C(O)—Ar' group, with Ar and Ar', equal to or different from each other, being aromatic groups. The recurring units ($R_{PAEK}$) are generally selected from the group consisting of formulae (J-A) to (J-O), herein below:

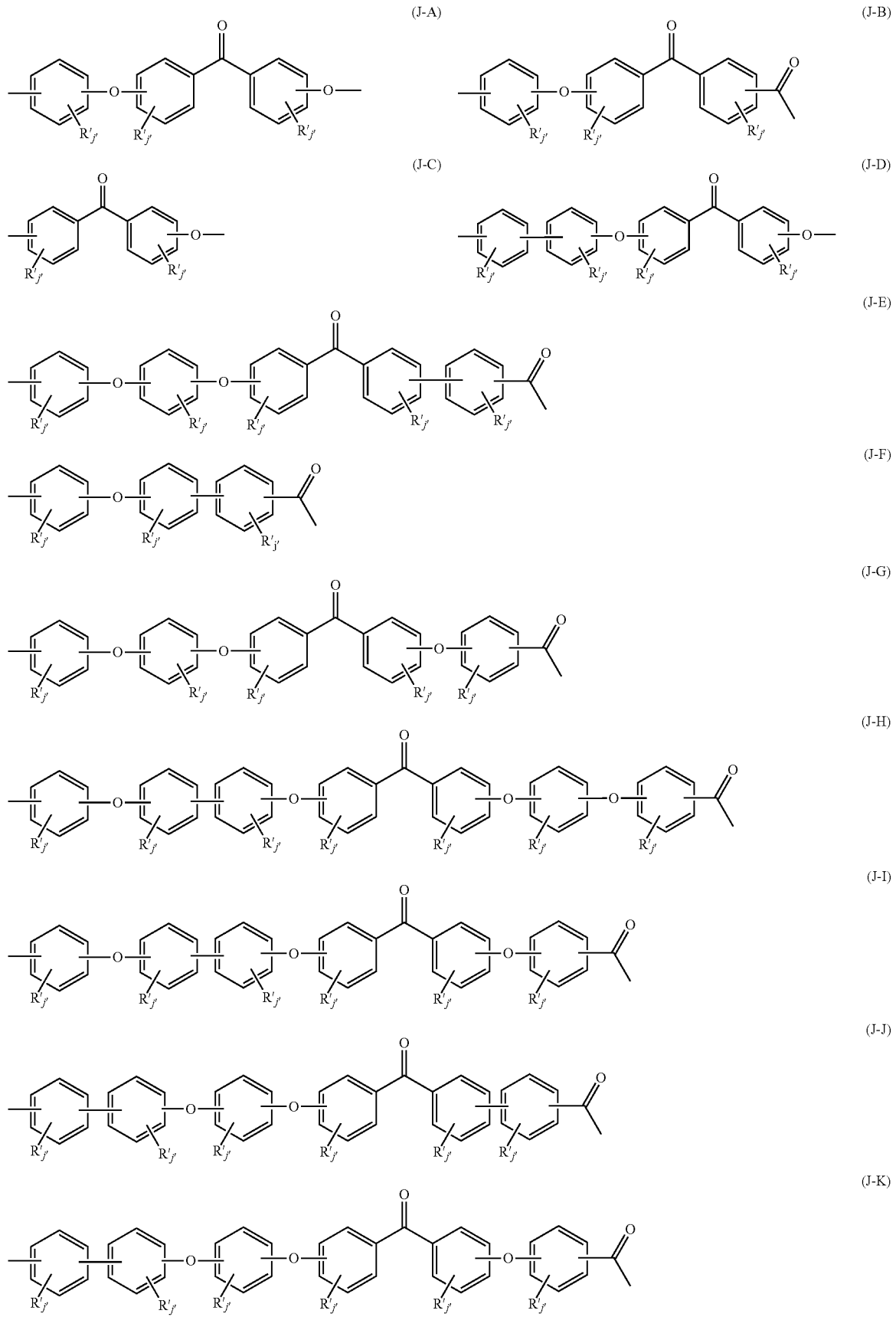

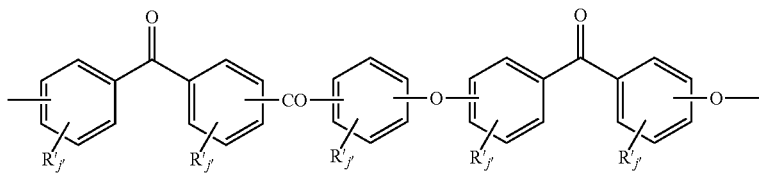
(J-L)

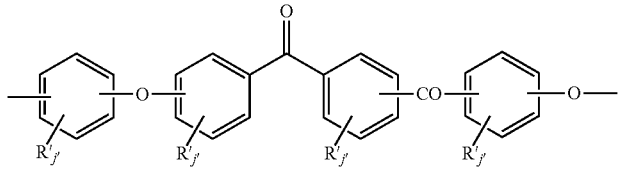
(J-M)

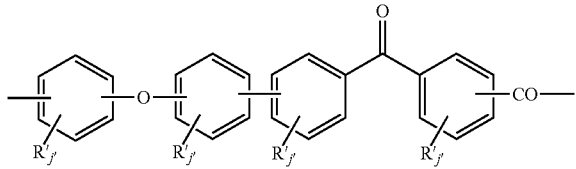
(J-N)

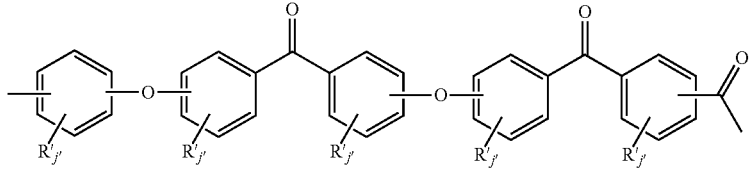
(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

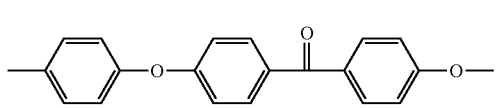
(J'-A)

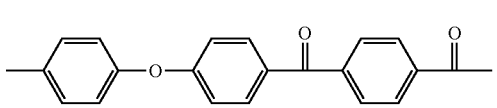
(J'-B)

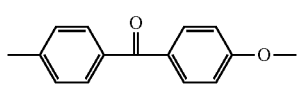
(J'-C)

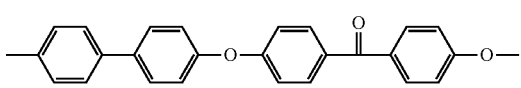
(J'-D)

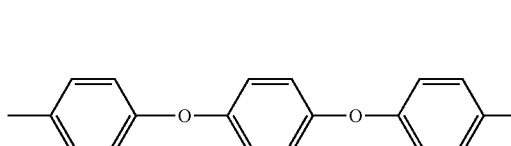
(J'-E)

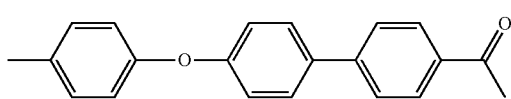
(J'-F)

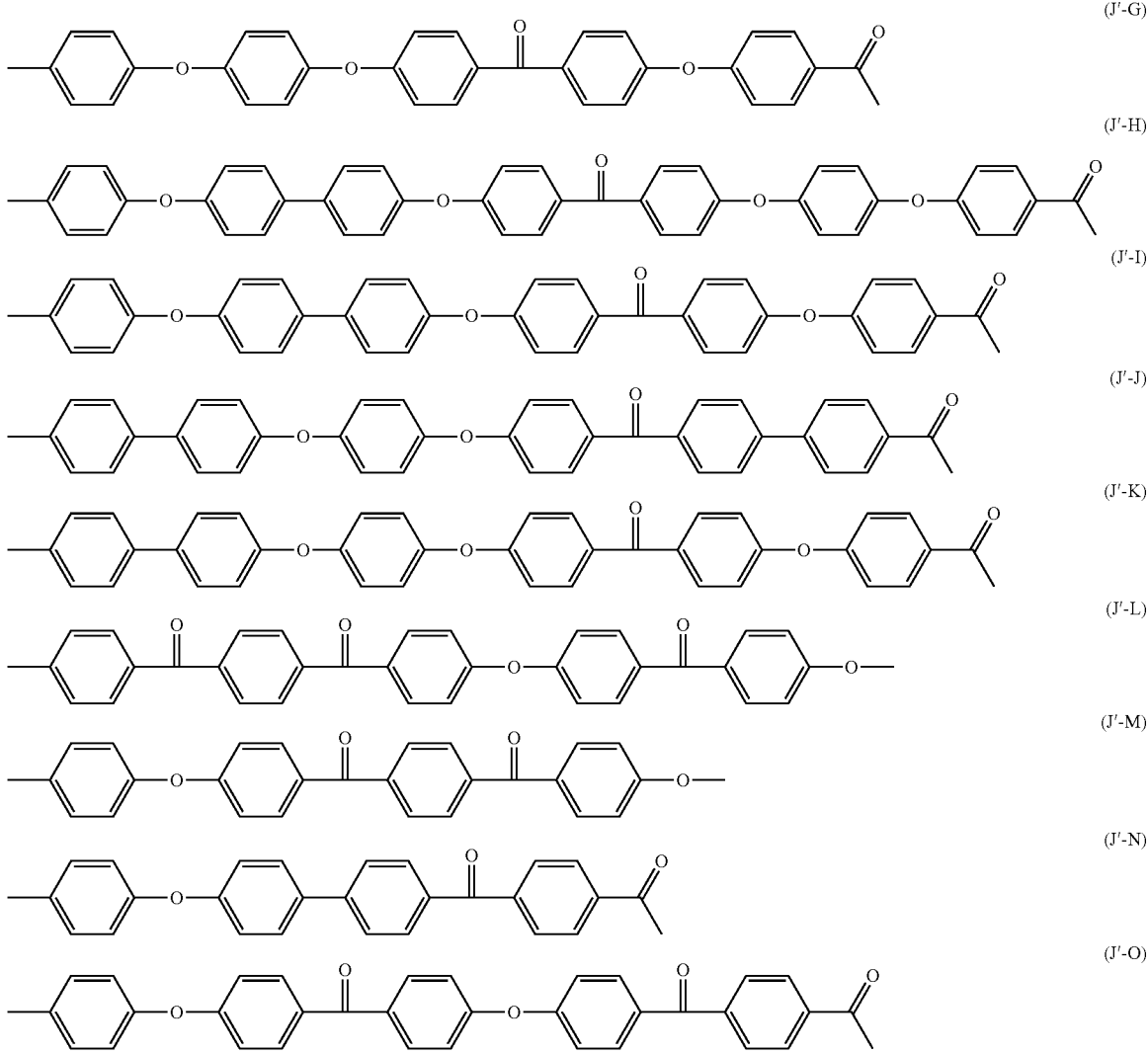

Non limitative examples of commercially available polyaryletherketone (PAEK) resins suitable for the invention include the KETASPIRE® polyetheretherketone commercially available from Solvay Specialty Polymers USA, LLC and VICTREX® PEEK polyetheretherketone, from Victrex, Plc., which are polymers, the recurring units of which are recurring units (k-c1):

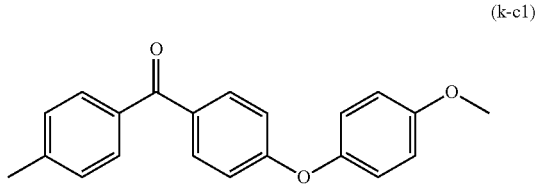

(k-c1)

The expression "polyesters including aromatic moieties (PEs)" is hereby intended to encompass polyesters comprising recurring units including at least one aromatic group and which are connected to each other through ester bonds.

Exemplary embodiment's of polyesters including aromatic moieties are polyethylene terephthalate (PET), polyethylenenaphthenate (PEN), polycyclohexylenedimethylene terephthalate (PCT), polybutylene terephthalate (PBT) and the like.

The term "liquid crystal polymers (LCP)" encompasses notably fully aromatic liquid crystalline polyesters.

Fully aromatic liquid crystalline polyester generally comprise recurring units derived from polycondensation of
an aromatic acid component [monomer (AA)] comprising one or more than one aromatic dicarboxylic acid or derivative thereof, preferably selected from phthalic acids, naphthalene dicarboxylic acids and pyridine dicarboxylic acids, and corresponding substituted counterparts; and
a dihydroxyl component [monomer (BB)] comprising one or more than one di-hydroxyl aromatic derivative or derivative thereof, preferably selected from biphenol, 4,4'-dihydroxy-1,1-biphenyl, and corresponding substituted counterparts;
and/or from polycondensation of one or more than one aromatic hydroxyl-substituted carboxylic acid or derivatives thereof [monomer (AB)], preferably selected from 4-hydroxybenzoic acid, 6-hydroxy-é-naphthoic acids, and corresponding substituted counterparts, being understood that monomers (AB) can be polymerized alone or in combinations with monomers (AA) and (BB), as above detailed.

Non limitative examples of commercially available fully aromatic liquid crystalline polyesters are notably VECTRA® LCP from Hoechst-Celanese, known for possessing $T_g$ of 145° C. or above and XYDAR® LCP from Solvay Specialty Polymers USA, LLC, generally characterized by HDT values exceeding 200° C., when determined under a 1.8 MPa load according to ASTM D648.

VECTRA® LCP is typically synthesized from 4-hydrobenzoic acid and 6-hydroxy-2-naphtoic acid; VECTRA® LCP is a polymer the recurring units of which are recurring units (Icp-A) and (Icp-B), typically in a ratio (Icp-A)/(Icp-B) of about 25/75:

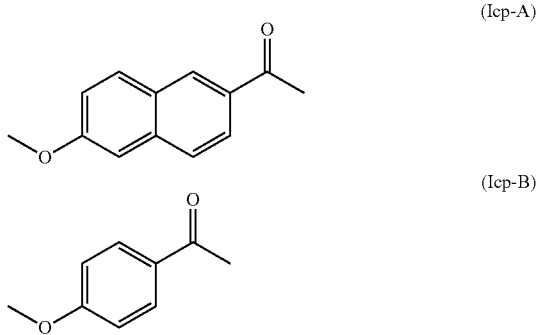

XYDAR LCP is typically synthesized from 4-hydroxybenzoic acid, 4,4'-dihydroxy-1,1'-biphenyl, and terephthalic acid; the basic structure can be modified by using other monomers such as isophthalic acid or 4-aminobenzoic acid; XYDAR® LCP is generally a polymer the recurring units of which are recurring units (Icp-C), (Icp-D) and (Icp-B), typically in a ratio [(Icp-C)+(Icp-D)]/(Icp-B) of about ½:

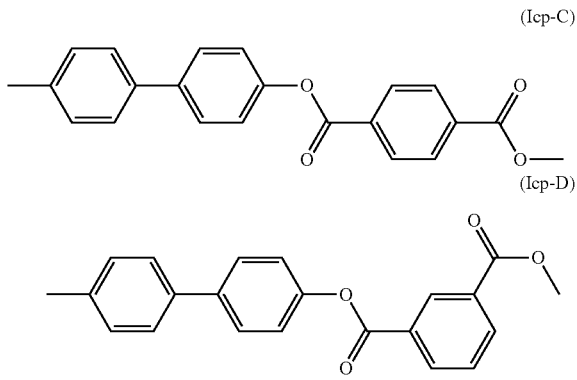

For the purpose of the present invention, the expression "aromatic polyamide polymer (PA)" is intended to denote a polyamide that comprises more than 35 mol %, preferably more than 45 mol %, more preferably more than 55 mol %, still more preferably more than 65 mol % and most preferably more than 75 mol % of aromatic recurring units comprising at least one amide group [recurring units ($R_{PA}$)].

For the purpose of the present invention, the expression "aromatic" with reference to recurring units ($R_{PA}$) is intended to mean that said recurring units comprise at least one aromatic group. The recurring units ($R_{PA}$) may be formed by the polycondensation of at least one aromatic dicarboxylic acid with a diamine or by the polycondensation of at least one dicarboxylic acid with an aromatic diamine, or by the polycondensation of an aromatic amino-acid.

According to a first embodiment, the recurring units ($R_{PA}$) are recurring units ($R_{PPA}$) deriving from polycondensation reaction of:

(i-1) a dicarboxylic acid component [acid component (AA)], wherein said acid component (AA) comprises at least one aromatic dicarboxylic acid or derivative thereof [acid (AR)]; and (i-2) a diamine component [amine component (NN)] comprising at least one aliphatic alkylene-diamine [amine (NN)], and/or from polycondensation reaction of:

(i-3) an aromatic aminoacid component [aminoacid component (ArN)], comprising at least one aromatic carboxylic acid comprising at least one amino group.

Recurring units ($R_{PPA}$) can thus be obtained from polycondensation of an acid component (AA), a diamine component (NN), optionally in the presence of an aminoacid component (ArN), or can be obtained from polycondensation of an aminoacid component (ArN), being understood that additional components, including end-capping, branch-point monomers or other non-aromatic monomers can be further used.

The acid component (AA) may comprise in addition to said at least one aromatic dicarboxylic acid [acid (AR)], one or more than one non-aromatic dicarboxylic acid [acid (AL)].

Non limitative examples of acids (AR) are notably phthalic acids [acids (PA)], including isophthalic acid (IA), terephthalic acid (TA) and orthophthalic acid (OA), and substituted counterparts, including 5-ter-butylisophthalic acid, 2-phenoxy-terephthalic acid; and other aromatic dicarboxylic acids, including 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, the 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid, 1,2-naphthalene dicarboxylic acid, biphenyldicarboxylic acids of formulae:

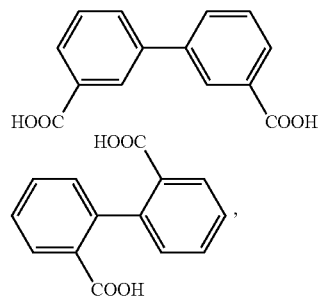

diphenylmethane dicarboxylic acids of formulae:

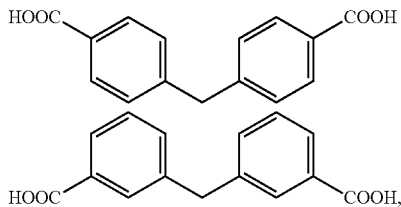

4,4'-oxybis(benzoic acid) of formula:

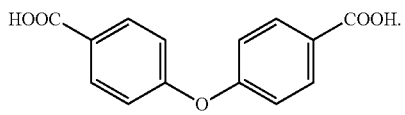 [SMILES: O=C(O)c1ccc(Oc2ccc(C(=O)O)cc2)cc1]

Among acids (AL), mention can be notably made of oxalic acid (HOOC—COOH), malonic acid (HOOC—CH$_2$—COOH), adipic acid [HOOC—(CH$_2$)$_4$—COOH], succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{11}$—COOH], cis- and/or trans-cyclohexane-1,4-dicarboxylic acid and cis- and/or trans-cyclohexane-1,3-dicarboxylic acid (CHDA).

According to preferred embodiments of the present invention, the acid component (AA) comprises advantageously at least one phthalic acid selected from the group consisting of isophthalic acid (IA), and terephthalic acid (TA). Isophthalic acid and terephthalic acid can be used alone or in combination. The phthalic acid is preferably terephthalic acid, optionally in combination with isophthalic acid.

The acid component (AA) according to this preferred embodiment comprises said phthalic acid in an amount of at least 35% moles, preferably at least 50% moles, based on the all components of the acid component (AA).

The diamine component [amine component (NN)] comprises at least one aliphatic alkylene-diamine.

Said aliphatic alkylene-diamine are typically aliphatic alkylene diamines having 2 to 18 carbon atoms.

Said aliphatic alkylene diamine is advantageously selected from the group consisting of 1,2-diaminoethane, 1,2-diaminopropane, propylene-1,3-diamine, 1,3-diaminobutane, 1,4-diaminobutane, 1,5-diaminopentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,5-diamino-2-methylpentane (2-MPMD), 1,3-pentanediamine (DAMP), 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane.

The amine component (NN) preferably comprises at least one diamine selected from the group consisting of 1,6-diaminohexane, 1,8-diamino-octane, 1,10-diaminodecane, 1,12-diaminododecane and mixtures thereof. More preferably, the amine component (NN) comprises at least one diamine selected from the group consisting of 1,6-diaminohexane, 1,10-diaminodecane and mixtures thereof.

In addition to the at least one aliphatic alkylene-diamine, the amine component (NN) can further comprise at least one diamine different from said aliphatic alkylene-diamine.

Said additional diamine can be notably an aromatic diamine (NN$_{Ar}$), preferably selected from the group consisting of m-phenylene diamine (MPD), p-phenylene diamine (PPD), 3,4'-diaminodiphenyl ether (3,4'-ODA), 4,4'-diaminodiphenyl ether (4,4'-ODA), m-xylylenediamine (MXDA), and p-xylylenediamine (PXDA), as shown below:

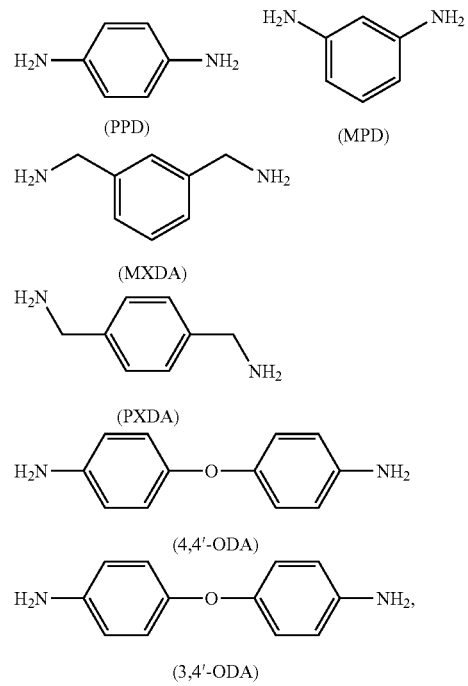

or can be notably a cycloaliphatic diamine (NN$_{Cy}$), preferably selected from the group consisting of isophoronediamine (also known as 5-amino-(1-aminomethyl)-1,3,3-trimethylcyclohexane), 1,3-cyclohexanebis(methylamine) (1,3-BAMC), 1,4-cyclohexanebis(methylamine) (1,4-BAMC), 4,4-diaminodicyclohexylmethane (PACM), and bis(4-amino-3-methylcyclohexyl)methane.

The aromatic aminoacid component (ArN) comprises at least one aromatic aminoacid or derivative thereof; said aromatic amino-acid is generally selected from the group consisting of 4-(aminomethyl)benzoic acid and 4-aminobenzoic acid.

The aromatic polyamide polymer (PA) of this first embodiment can also comprise, in addition to recurring units derived from polycondensation of monomers listed under paragraphs (i-1) [acid component (AA)], (i-2) [amine component (NN)] and (i-3) [aminoacid component (ArN)], recurring units derived from polycondensation of an aliphatic or cycloaliphatic aminoacid component, including notably 4-aminocyclohexanecarboxylic acid (cis or trans), 4-(aminomethyl)-cyclohexanecarboxylic acid (cis or trans).

According to a second embodiment, the recurring units ($R_{PA}$) are recurring units ($R_{PXA}$) deriving from polycondensation reaction of:

(i-1) a dicarboxylic acid component [acid component (AA')], wherein said acid component (AA') comprises at least one non-aromatic dicarboxylic acid or derivative thereof [acid (AL')]; and (i-2) a diamine component [amine component (NN')] comprising at least one aromatic diamine [amine ($NN_{Ar}$)].

The acid component (AA') may comprise in addition to said at least one non-aromatic dicarboxylic acid [acid (AL')], one or more than one aromatic dicarboxylic acid [acid (AR')].

Acids (AL') and acids (AR') suitable for being used in the aromatic polyamides of this second embodiment are the same as those above described respectively as acids (AL) and acids (AR) herein above, and are hereby described with reference to what specified above.

The diamine component [amine component (NN')] comprises at least one aromatic diamine [amine ($NN_{Ar}$)]. Said amine ($NN_{Ar}$) is preferably selected from the group consisting of m-phenylene diamine (MPD), p-phenylene diamine (PPD), 3,4'-diaminodiphenyl ether (3,4'-ODA), 4,4'-diaminodiphenyl ether (4,4'-ODA), m-xylylenediamine (MXDA), and p-xylylenediamine (PXDA), as shown below:

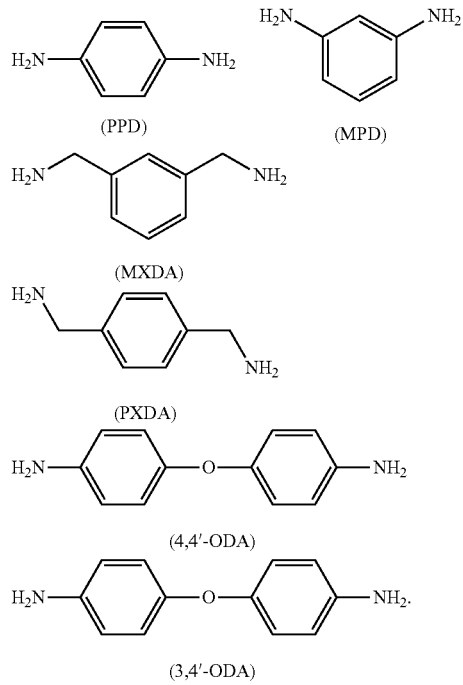

Said amine ($NN_{Ar}$) is more preferably m-xylylenediamine (MXDA).

The amine component (NN') can comprise, in addition to said amine ($NN_{AR}$), one or more than one non-aromatic diamines [amine ($NN_{AL}$)], preferably selected from the group consisting of aliphatic alkylene-diamines, as above detailed with reference to first embodiment, and cycloaliphatic diamines, said cycloaliphatic diamines being preferably selected from the group consisting of isophoronediamine (also known as 5-amino-(1-aminomethyl)-1,3,3-trimethylcyclohexane), 1,3-cyclohexanebis(methylamine) (1,3-BAMC), 1,4-cyclohexanebis(methylamine) (1,4-BAMC), 4,4-diaminodicyclohexylmethane (PACM), and bis(4-amino-3-methylcyclohexyl)methane.

For the purpose of the present invention, the expression "polycarbonates (PC)" is intended to refer to polymers comprising more than 35 mol %, preferably more than 45 mol %, more preferably more than 55 mol %, still more preferably more than 65 mol % and most preferably more than 75 mol % of recurring units having at least one carbonate group (—O—(C═O)—O—) and at least one aromatic group.

Generally polycarbonates (PC) have following recurring units:

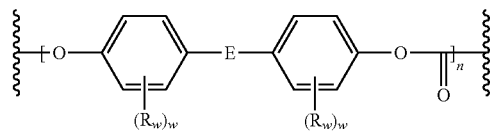

wherein:
Rw is a halogen or a hydrocarbon group, possibly comprising heteroatoms;
w is zero or an integer of 1 to 4;
E is a bond, a hydrocarbon group, possibly comprising heteroatoms or a divalent group comprising heteroatoms.

Particularly useful are
(i) polycarbonates (PC) wherein all the recurring units are of formula (A):

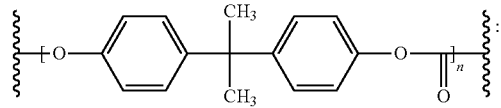

these polycarbonates (PC) are generally obtained by reaction of bis-phenol A and phosgene; and (ii) polycarbonates (PC) comprising recurring units of formula (B):

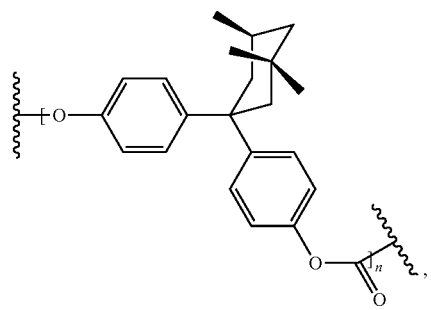

possibly in combination with recurring units of formula (A), above; these polycarbonates are generally obtained by reaction of 1,1-bis-(4-hydroxyphenyl)-3,3,5-trimethylcyclohexane (BPTMC) and phosgene, possibly in the presence of bisphenol A and are notably available as High Temperature APEC® polycarbonates from Bayer.

The composition of the invention may additionally comprise, generally in an amount of from about 5 weight percent to about 70 weight percent, with respect to the total weight of the composition, at least one filler material, which is different from compound (B).

The filler material can be notably selected from the group consisting of inorganic filler [material (I)] and carbonaceous filler material [material (C)].

The filler may have various morphologies, for example isotropic, including spherical shapes, platy or acicular.

The fillers may therefore be notably in the form of fibres, hollow or solid pellets, powders.

Within the context of the present invention, the expressions "inorganic filler material" and "material (I)" are intended to denote all those materials which essentially consist of inorganic salts or oxides, different from compound (B).

Non limitative examples of materials (I) which can be used are notably inorganic oxides, inorganic silicates, inorganic sulphates, nitrides, carbides and the like. Inorganic oxides are generally selected among Si, Zr, Ce(+IV) and Ti oxides and mixed oxides comprising these metals in combination with one or more other metal(s) or non metal(s); e.g. $TiO_2$, silica/silicon oxides (including natural and synthetic oxides), alumina/aluminium oxides (including natural and synthetic oxides), zirconia/zirconium oxides (including natural and synthetic oxides), zirconates, $CeO_2$, glass, kaolinite, talc, mica, wollastonite, diatoms, and the like. Among nitrides and carbides, silicon nitride and silicon carbide can be mentioned. Inorganic silicates include notably alumino-silicates (including natural and synthetic clays), calcium silicate, cement and the like. Inorganic sulphates are generally selected among alkaline and alkaline earth metal sulphates, including Ca, Mg, Ba, Sr sulphates.

Among materials (I), according to certain embodiments, the filler material is a material (I) selected from the group consisting of glass fibers. Glass fibers fillers may have a round cross-section or a non-circular cross-section ("flat glass fibers"), including oval, elliptical or rectangular. The glass fibers may be added as endless fibers or as chopped glass fibers. The glass fibers have generally an equivalent diameter of 5 to 20 preferably of 5 to 15 μm and more preferably of 5 to 10 μm. E glass fibers are especially used as chopped glass fibers, or as endless fibers (roving). However, all other glass fiber types, such as A, C, D, M, S, R glass fibers or any mixtures thereof or mixtures with E glass fibers may be used.

Within the context of the present invention, the expressions "carbonaceous filler material" and "material (C)" are intended to denote all those materials which essentially consist of carbon. It is understood that said carbonaceous materials might comprise reduced amounts of other elements (e.g. H, O, N, S . . . ), without this significantly affecting the physico-chemical properties of the carbonaceous material itself. The carbonaceous material can be notably carbon black of can be notably carbon fibers.

It is further understood that the composition may further comprise one or more usual additives, including, but not limited to, lubricants, pigments, thermal stabilizers, flame-retardants, processing-aids, and the like.

Another aspect of the present invention is a method for manufacturing the composition, as above detailed.

The method of the invention advantageously comprises mixing at least the said aromatic sulfone polymer [polymer (P)]; the organic UV absorber [absorber (UV)]; and the basic compound (B). Other optional ingredients may be equally mixed in the method of the invention for finally providing for the composition as above detailed.

The polymer (P) is generally provided in the method of the invention under the form of a powder or under the form of pellets. The expression "powder" has to be understood as possessing the usual meaning, i.e. under the form of loose discrete particles of material.

The method generally comprises mixing the said ingredients by blending in the molten state (melt blending); conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the polymer (P) and advantageously obtain a homogeneous distribution of the different ingredients. It is hence advantageously possible to obtain strand extrudates of the composition of the invention. Such strand extrudates can be chopped by means e.g. of a rotating cutting knife after some cooling time on a conveyer with water spray, so as to provide the composition under the form of pellets or beads, which can be further can processed for the manufacture of shaped articles.

The method may additionally comprise, prior to the melt blending, a preliminary step of dry blending a powder of polymer (P) in the solid state with the absorber (UV) and/or the basic compound (B). Typically, the dry blending, as detailed above is carried out by using high intensity mixers, such as notably Henschel-type mixers and ribbon mixers.

Thus, the polymer composition (C) is notably very well suited for the manufacture of articles useful in a wide variety of end uses.

The composition of the invention is particularly suitable for being used for manufacturing films, sheets, pipes, tubes or other finished articles.

Non limitative examples of articles which can be made at least in part from the composition of the invention are:
  plumbing articles used for the transportation of water or other fluids, including under pressure, such as fittings, rings, faucets, valves and manifolds. Common fields of use thereof include domestic hot and cold water, radiator heating systems, floor and wall heating and cooling systems, compressed air systems and piping systems for natural gas;
  medical/dental/healthcare articles such as medical instruments or parts of instruments (notably handles and viewing glasses), components of medical equipment's that handle or dispense chemicals used in medical procedures (such as anesthesia), cases and trays used to hold such instruments;
  aircraft interiors articles such as panels and components (duct elements, structural brackets, fasteners, cabin interior components or other light or medium duty structural elements and components) on aircraft;
  food service articles such as warming trays, steam table trays, plastic cook ware;
  dairy equipment articles such as piping systems used for the collection or transportation of milk and other dairy products;
  laboratory equipment articles such as funnels, filter devices and other lab equipment;

electronic articles such as structural parts of electronic devices, including fitting parts, snap fit parts, screw bosses parts, mutually moveable parts, functional elements, operating elements, tracking elements, adjustment elements, carrier elements, frame elements, films, in particular speaker films, switches, connectors, cables, housings, any structural part integrated on housings and any other structural part other than housings as used in a mobile electronic devices, such as for example speaker parts, antenna components and support elements, keypad buttons, battery cover, front cover, which are used in mobile electronic devices including mobile phones tablets, laptop computers and the like;

electric and electromagnetic wire insulation coatings;

parts for automotive applications, e.g. that encounter elevated temperatures and/or aggressive chemical environments.

Should the disclosure of any patents, patent applications, and publications which are incorporated herein by reference conflict with the description of the present application to the extent that it may render a term unclear, the present description shall take precedence.

The invention will now be described with reference to the following examples, whose purpose is merely illustrative and not intended to limit the scope of the present invention.

EXAMPLES

Raw Materials:

Polymer-1: Radel® R-5100 NT is a polyphenylsulfone PPSU homopolymer from Solvay Specialty Polymers USA, L.L.C.

Polymer-2: Victrex® PEEK 150P is a polyetheretherketone from Victrex plc.

Polymer-3: Udel® P-1700 is a polysulfone PSU homopolymer homopolymer from Solvay Specialty Polymers USA, L.L.C.

$TiO_2$: Ti-Pure R-105 is a maximum-durability grade of $TiO_2$ from DuPont®.

Metal Oxide-1: Kyowamag® MF-150 is a grade of magnesium oxide from Kyowa Chemical Industry Co. Ltd.

Metal Oxide-2: KW-2200 is a grade of aluminum magnesium oxide (~35% $Al_2O_3$ and ~60% MgO) from Kyowa Chemical Industry Co. Ltd.

Metal Oxide-3: CA602 is a grade of calcium oxide from Mississippi Lime.

UV-1: Tinuvin® 1600 is a hydroxyphenyl triazine UV absorber of formula (T1), as above detailed, from BASF.

UV-2: Tinuvin® 460 is a hydroxyphenyl triazine UV absorber of formula (T2) from BASF.

UV-3: Tinuvin® 1577 is a hydroxyphenyl triazine UV absorber of formula (T11) from BASF.

UV-4: Cyasorb® UV-3638F is a UV stabilizer from the benzoxazin-4-one family of formula (BX1), as above detailed, from Cytec Industries Inc.

UV-5: Uvinul® 3030 is a cyanoacrylate UV absorber of formula (CN3), as above detailed, from BASF.

UV-6: Tinuvin® 360 is a benzotriazole UV absorber of formula (BT1), as above detailed, from BASF.

UV-Visible Spectroscopy.

The UV absorbers were dissolved in HPLC grade methylene chloride at 10 ppm concentration. The solutions were analyzed using a Perkin Elmer Lambda 950 UV/Vis spectrometer. The spectrum was obtained using methylene chloride in the reference cell. FIG. 1 is a plot of absorbance as a function of wavelength for three different UV absorbers of hydroxyphenyl-triazine type (UV-1, UV-2, UV-3, solid lines), for a UV absorber of benzoxazin-4-one type (UV-4, dotted line), for a UV absorber of cyano-acrylate-type (UV-5, dotted line), and a UV absorber of benzotriazole type (UV-6, dotted line) (as 10 ppm solution in methylene chloride). As clear from FIG. 1, UV absorbers of hydroxyphenyl-triazine type, and in particular UV-1, appear to possess the highest coefficient of extinction in the relevant UV region, so as to possibly suggest these compounds as most effective UV absorbers.

General Procedure for the Preparation of the Compositions

All of the ingredients, as detailed in Table 1, were fed in the first barrel of a ZSK-26 twin-screw extruder comprising twelve zones via several weight and loss feeders. The screw rate was 200 rpm. The barrel temperature settings were in the range of 340 to 360° C. The so obtained extrudates were cooled and pelletized using conventional equipment.

The nature and the quantity of the various ingredients are summarized in Table 1, indicating the amount of each ingredient in weight %.

Color Measurement.

The L, a and b values were measured on color chips using a X-Rite Color i7 benchtop spectrophotometer. The measurements were done in reflection, SCI (Specular Component Included) mode with a CWF (Cool White Fluorescent) primary illuminant. The reported values are the average of three measurements made on three color chips.

UV Conditioning

Color chips were exposed to filtered xenon arc light under controlled environmental conditions (Atlas Model Ci4000 Xenon Arc Weather-Ometer® S/N 15733) as defined by ASTM D4459-06 and ASTM G155-05a. The irradiance at 420 nm was controlled at 0.8±0.05 W/($m^2$·mm). The black panel operating temperature was 55° C. and the operating relative humidity was 55%. The color difference between the exposed specimens and the control specimens was characterized by CIE94 ΔE and according to the color measurement method described above. Results are summarized in Tables 1 to 3.

The results summarized in table 1 clearly demonstrate that organic UV absorbers, although possessing very high absorption coefficients towards UV light when in solution, are not effective in stabilizing sulfone polymer matrices unless used in combination with above mentioned basic compounds.

TABLE 1

| Run | CE-1 | CE-2 | E-3 | CE-4 | E-5 | CE-6 | E-7 |
|---|---|---|---|---|---|---|---|
| Polymer-1 | 85 | 84 | 82 | 84 | 82 | 84 | 82 |
| $TiO_2$ | 15 | 15 | 15 | 15 | 15 | 15 | 15 |
| Metal Oxide-1 | | | 2 | | 2 | | 2 |
| UV-1 | | 1 | 1 | | | | |
| UV-2 | | | | 1 | 1 | | |
| UV-3 | | | | | | 1 | 1 |
| CIE94 ΔE | 14.2 | 14.2 | 11.4 | 11.0 | 7.7 | 12.9 | 11.8 |

As it can be seen in Table 1, in the absence of any stabilizers, Polymer-1, in admixture with a white pigment, undergoes a deviation in color of about 14 (see CE-1). Substantially no improvement is gained with UV-1 alone (CE-2): the UV-1 stabilizers only become effective when used in combination with a metal oxide, as above specified (see E-3). Same trend is demonstrated for the other organic UV stabilizers of hydroxyphenyl-triazine type (UV-2 and UV-3), which are shown to enable better retention of color (i.e. lower values of CIE94 ΔE), when combined with a metal oxide, as above defined.

TABLE 2

| Run | CE-2 | E-3 | E-8 | E-9 | E-10 | E-11 |
|---|---|---|---|---|---|---|
| Polymer-1 | 85 | 82 | 83.5 | 83 | 82 | 82 |
| TiO$_2$ | 15 | 15 | 15 | 15 | 15 | 15 |
| Metal Oxide-1 | | | 2 | | | |
| Metal Oxide-2 | | | | 0.5 | 1 | 2 |
| Metal Oxide-3 | | | | | | 2 |
| UV-1 | | 1 | 1 | 1 | 1 | 1 |
| CIE94 ΔE | 14.2 | 11.4 | 12.9 | 11.4 | 10.3 | 13.2 |

TABLE 3

| Run | CE-12 | CE-13 | E-14 | CE-15 | E-16 |
|---|---|---|---|---|---|
| Polymer-1 | 68 | 67.2 | 65.6 | | |
| Polymer-2 | 17 | 16.8 | 16.4 | | |
| Polymer-3 | | | | 84 | 82 |
| TiO$_2$ | 15 | 15 | 15 | 15 | 15 |
| Metal Oxide-1 | | | 2 | | 2 |
| UV-1 | | 1 | 1 | 1 | 1 |
| CIE94 ΔE | 14.5 | 14.5 | 10.4 | 3.6 | 2.7 |

Example 14 (whose performances are to be compared with those of CE-12 and CE-13) demonstrate that the combination of the organic UV absorber (in the examples of hydroxyphenyltriazine type) and the basic metal oxide is effective not only in polymer compounds made of sulfone polymers only, but also of compounds which include, in addition, other type of polymers (more precisely, in this case, PEEK polymers).

Example of comparison CE-15 and example E-16 are representative of the effectiveness of organic UV absorbers of ensuring retention of color in polysulfone (PSU)-type polymers: while the sensitivity of PSU to UV-induced degradation is less than propensity of PPSU in discoloring under UV ageing, also in PSU materials, the addition of basic metal oxides is effective in improving color shift: with these regards, a CIE94 ΔE of about 1 unit is of significance.

Table 4 herein below provides additional results obtained with UV absorbers of benzoxazin-4-one type (UV-4), of cyano-acrylate-type (UV-5), and of benzotriazole type (UV-6).

TABLE 4

| Run | CE-17 | E-18 | CE-19 | E-20 | CE-21 | E-22 |
|---|---|---|---|---|---|---|
| Polymer-1 | 84 | 82 | 84 | 82 | 84 | 82 |
| TiO$_2$ | 15 | 15 | 15 | 15 | 15 | 15 |
| Metal Oxide-1 | | 2 | | 2 | | 2 |
| UV-4 | 1 | 1 | | | | |
| UV-5 | | | 1 | 1 | | |
| UV-6 | | | | | 1 | 1 |
| CIE94 ΔE | 14.2 | 13.7 | 12.3 | 11.3 | 12.4 | 8.5 |

In all cases, organic UV absorbers, when used in sulfone polymers, exhibit improved performances in avoiding discoloring upon UV ageing when used in combination with basic metal oxides, as above detailed.

The invention claimed is:
1. A composition comprising:
at least one aromatic sulfone polymer (P);
at least one organic UV absorber selected from the group consisting of hydroxylphenyl-triazine compounds (T), in an amount of at least 0.1 weight parts and at most 10 weight parts of the at least one organic UV absorber per 100 weight parts of the at least one aromatic sulfone polymer (P); and
at least one basic compound (B) selected from the group consisting of magnesium oxide, calcium oxide, and mixed oxides comprising magnesium oxide, calcium oxide, or both, in an amount of at least 0.001 weight parts and at most 10 weight parts of the at least one basic compound (B) per 100 weight parts of the at least one aromatic sulfone polymer (P), wherein the at least one hydroxylphenyl-triazine compound (T) is of formula (I):

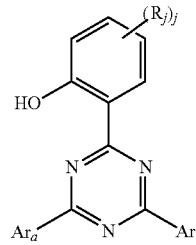

formula (I)

wherein:
Ar$_a$ and Ar$_b$, equal to or different from each other, are independently aromatic groups, said aromatic groups possibly comprising one or more than one heteroatom;
Rj is a halogen or a hydrocarbon group possibly comprising one or more than one heteroatom;
j is zero or is an integer of 1 to 4; and
wherein the aromatic sulfone polymer (P) contains no recurring unit other than recurring units (R$_{SP}$) selected from the group consisting of the following units:

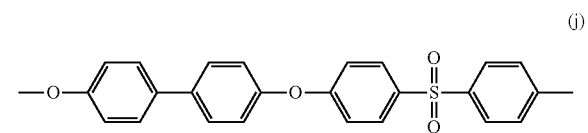

(j)

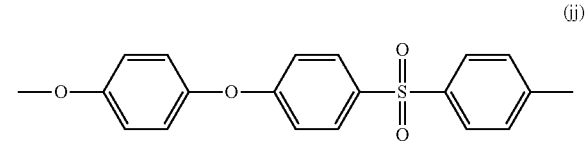

(jj)

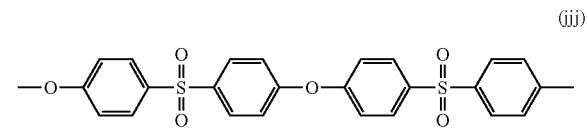

(jjj)

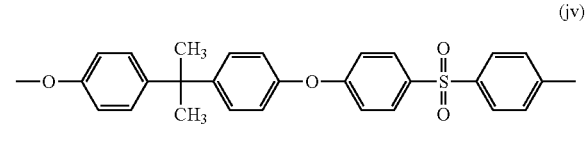

(jv)

and mixtures thereof.

2. The composition of claim 1, wherein the hydroxylphenyl-triazine compound (T) is selected from the group consisting of compounds of any formulae below:

with m being an integer of 1 to 20,
formula (T1)
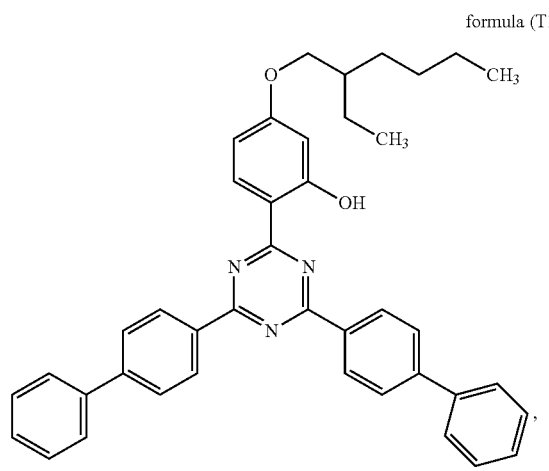
formula (T5)
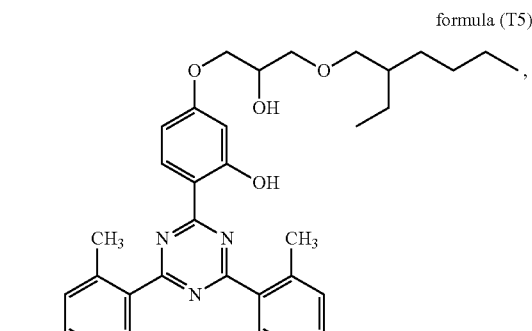
formula (T2)
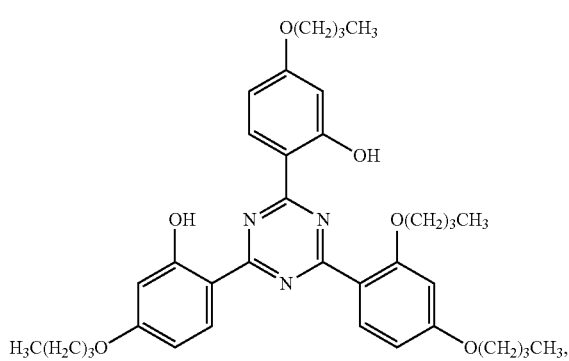
formula (T6)
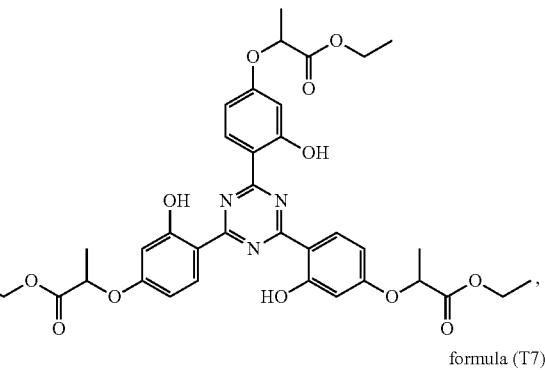
formula (T3)
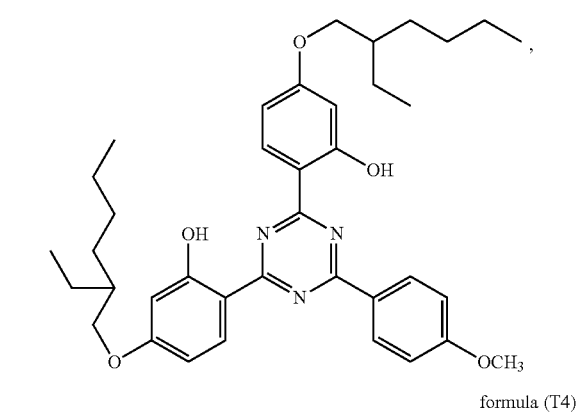
formula (T7)
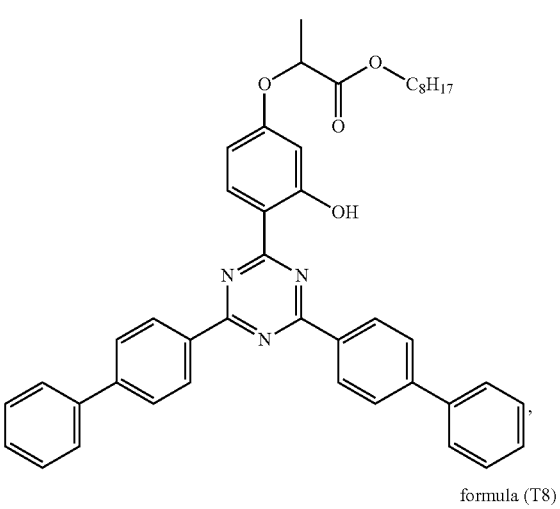
formula (T4)
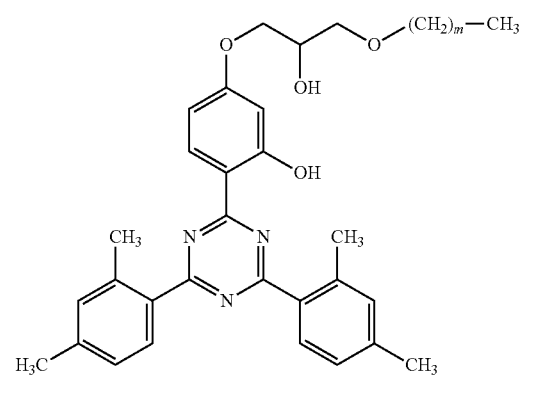
formula (T8)
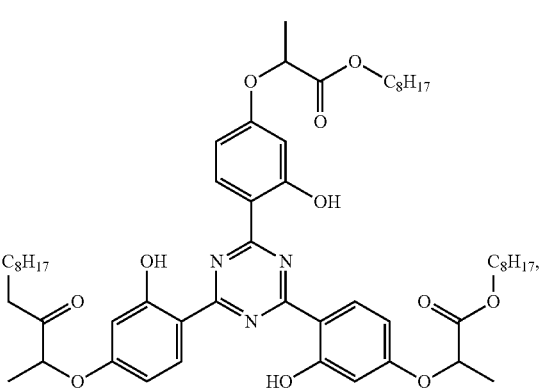

formula (T9)

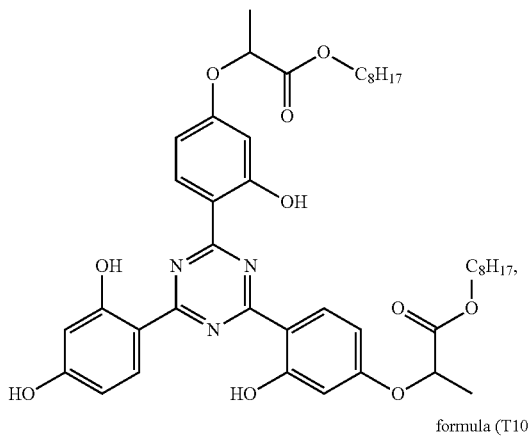

formula (T10)

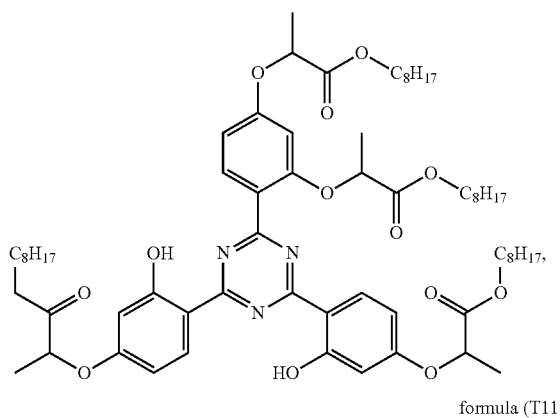

formula (T11)

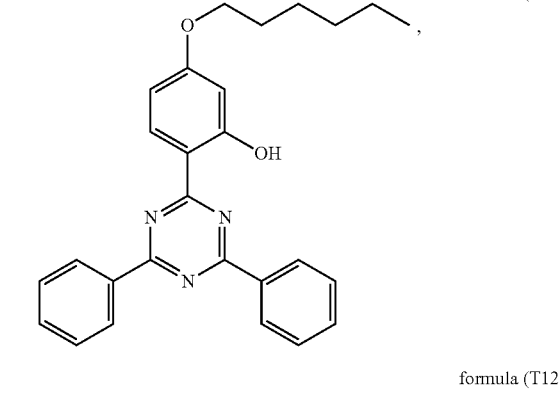

formula (T12)

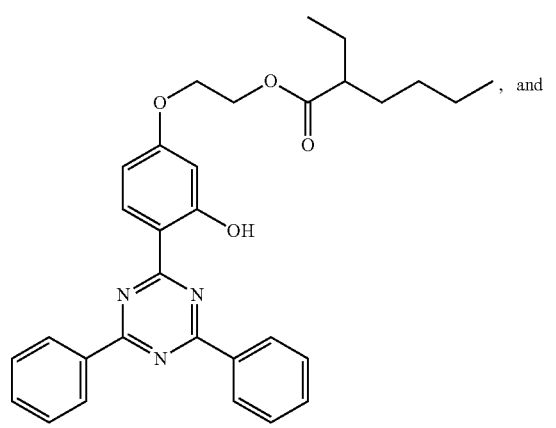, and formula (T13)

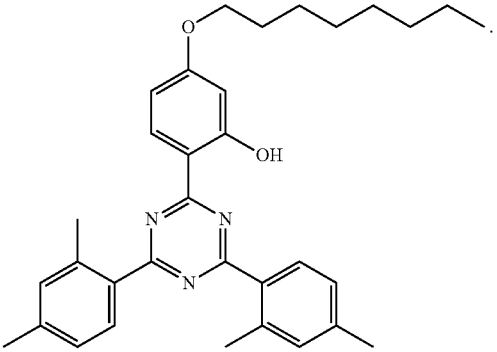

3. The composition according to claim 1 comprising at least 50% weight of the aromatic sulfone polymer (P), with respect to the total weight of the composition.

4. The composition according to claim 1, further comprising an additional polymer (P') different from the polymer (P), wherein said polymer (P') is selected from the group consisting of aromatic polyimides (PI), polyester-imides (PEI), polyamide-imides (PAI), polyaryletherketones (PAEK), polyetheretherketones (PEEK), polyetherketoneketones (PEKK), liquid crystal polymers (LCP), semi-aromatic polyamides (PA), polyamides derived from aromatic dicarboxylic acids (PPA), polyamides derived from aromatic diamines (PXA), polycarbonates (PC), and mixtures thereof.

5. A method for making the composition according to claim 1, said method comprising mixing at least the aromatic sulfone polymer (P); the organic UV absorber; and the basic compound (B), said method comprising mixing the aromatic sultone polymer (P), organic UV absorber, and basic compound (B) by blending in the molten state.

6. An article made at least in part from the composition of claim 1, said article being selected from the group consisting of:
 plumbing articles used for the transportation of water or other fluids;
 medical/dental/healthcare articles;
 aircraft interiors articles;
 food service articles;
 dairy equipment articles;
 laboratory equipment articles;
 electronic articles;
 electric and electromagnetic wire insulation coatings; and
 parts for automotive under-the-hood uses.

7. The composition of claim 2, wherein the hydroxylphenyl-triazine compound (T) is formula (T4), and m is a mixture of 11 and 12.

8. The composition according to claim 1, wherein the basic compound (B) is the mixed oxide, and the mixed oxide is (Al$_2$O$_3$)(MgO).

9. The composition according to claim 1 comprising 0.1-8 weight parts of the at least one organic UV absorber, based on 100 weight parts of the at least one aromatic sulfone polymer (P).

10. The composition according to claim 1 comprising 0.1-5 weight parts of the at least one organic UV absorber, based on 100 weight parts of the at least one aromatic sulfone polymer (P).

11. The composition according to claim 1 comprising 0.1-5 weight parts of the at least one basic compound (B), based on 100 weight parts of the at least one aromatic sulfone polymer (P).

12. The composition according to claim 1, wherein the recurring units of the aromatic sulfone polymer (P) are:
  the recurring units (j),
  the recurring units (jjj) and, optionally in addition, the recurring units (jj), or
  the recurring units (jv) and, optionally in addition, the recurring units (jj).

13. The composition according to claim 2, wherein the hydroxylphenyl-triazine compound (T) is selected from the group consisting of the compounds of any formulae (T1), (T2) and (T11).

* * * * *